(12) United States Patent
Kawakami et al.

(10) Patent No.: US 8,806,126 B2
(45) Date of Patent: Aug. 12, 2014

(54) STORAGE APPARATUS, STORAGE SYSTEM, AND DATA MIGRATION METHOD

(75) Inventors: Norihiko Kawakami, Sagamihara (JP); Hiroshi Hirayama, Yokohama (JP); Toru Tanaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 13/512,543

(22) PCT Filed: May 16, 2012

(86) PCT No.: PCT/JP2012/003215
§ 371 (c)(1),
(2), (4) Date: May 29, 2012

(87) PCT Pub. No.: WO2013/171793
PCT Pub. Date: Nov. 21, 2013

(65) Prior Publication Data
US 2013/0311739 A1    Nov. 21, 2013

(51) Int. Cl.
*G06F 12/00* (2006.01)
(52) U.S. Cl.
USPC .................. 711/114; 711/165; 711/170
(58) Field of Classification Search
None
See application file for complete search history.

(56) References Cited

U.S. PATENT DOCUMENTS

| | | |
|---|---|---|
| 6,928,526 B1 | 8/2005 | Zhu et al. |
| 2009/0037680 A1 | 2/2009 | Colbert et al. |
| 2010/0174881 A1 | 7/2010 | Anglin et al. |
| 2011/0307447 A1 | 12/2011 | Sabaa et al. |
| 2012/0102280 A1 | 4/2012 | Nasu et al. |

FOREIGN PATENT DOCUMENTS

EP    2 085 867 A2    8/2009

OTHER PUBLICATIONS

PCT International Search Report and Written Opinion on application PCT/JP2012/003215 mailed Nov. 14, 2012; 11 pages.

*Primary Examiner* — Shawn X Gu
(74) *Attorney, Agent, or Firm* — Foley & Lardner LLP

(57) ABSTRACT

Provided are a storage apparatus, a storage system, and a data migration method, with which a plurality of pool areas are assigned to a plurality of virtual volumes, the virtual volumes comprise virtual disks, the virtual disks comprise a plurality of logical segments, the pool areas comprise real volumes, the real volumes comprise a plurality of physical segments, logical segments are managed in association with physical segments, for each of the plurality of pool areas, and, if one virtual disk which is associated with one pool area is migrated to another pool area which differs from the one pool area, duplicate determination of data in the one pool area is executed, a data duplicate determination between the one pool area and the other pool area is executed on the basis of the result of the duplicate determination, and the one virtual disk is migrated to the other pool area.

13 Claims, 28 Drawing Sheets

FIG.4A

| LOGICAL SEGMENT ID | PHYSICAL SEGMENT ID | LUN | LOGICAL ADDRESS |
|---|---|---|---|
| 1 | 1 | 1 | 00001 |
| 2 | 3 | 1 | 00011 |
| 3 | 5 | 1 | 00021 |
| 4 | 1 | 2 | 00031 |
| 5 | 2 | 2 | 00041 |
| 6 | 4 | 2 | 00051 |
| 7 | 1 | 2 | 00061 |
| 8 | 1 | 2 | 00071 |
| 9 | 2 | 2 | 00081 |

LOGICAL SEGMENT MAPPING TABLE 400A

FIG.4B

| LOGICAL SEGMENT ID | PHYSICAL SEGMENT ID | LUN | LOGICAL ADDRESS |
|---|---|---|---|
| 1 | 1 | 1 | 00101 |
| 2 | 2 | 1 | 00111 |
| 3 | 3 | 1 | 00121 |
| 4 | 4 | 2 | 00131 |

LOGICAL SEGMENT MAPPING TABLE 400B

FIG.5A

| PHYSICAL SEGMENT ID (510A) | HASH ID (520A) | REFERENCE COUNTER (530A) | PHYSICAL ADDRESS (540A) |
|---|---|---|---|
| 1 | 1 | 4 | 00001 |
| 2 | 2 | 2 | 00011 |
| 3 | 3 | 1 | 00021 |
| 4 | 3 | 1 | 00031 |
| 5 | 5 | 1 | 00041 |

PHYSICAL SEGMENT MANAGEMENT TABLE 500A

FIG.5B

| PHYSICAL SEGMENT ID (510B) | HASH ID (520B) | REFERENCE COUNTER (530B) | PHYSICAL ADDRESS (540B) |
|---|---|---|---|
| 11 | 1 | 1 | 00101 |
| 12 | 2 | 1 | 00111 |
| 13 | 3 | 1 | 00121 |

PHYSICAL SEGMENT MANAGEMENT TABLE 500B

FIG.6A

| HASH ID | HASH VALUE |
|---|---|
| 1 | A |
| 2 | B |
| 3 | C |
| 4 | D |
| 5 | E |

610A / 620A

HASH TABLE 600A

FIG.6B

| HASH ID | HASH VALUE |
|---|---|
| 1 | B |
| 2 | E |
| 3 | F |

610B / 620B

HASH TABLE 600B

FIG.7

| LUN | POOL ID | LU DEDUPLICATION SETTING |
|---|---|---|
| 1 | A | ON |
| 2 | A | ON |
| 3 | B | ON |

LU MANAGEMENT TABLE 700

FIG.8

| POOL ID | POOL DEDUPLICATION SETTING |
|---|---|
| A | ON |
| B | ON |

POOL MANAGEMENT TABLE 800

FIG.9

| LOGICAL SEGMENT ID 910A | HASH VALUE 920A | COMPARISON TARGET ATTRIBUTE 930A | MIGRATION TARGET ATTRIBUTE 940A |
|---|---|---|---|
| 4 | A | ○ | ○ |
| 5 | B | ○ | × |
| 6 | D | ○ | ○ |
| 7 | A | × | × |
| 8 | A | × | × |
| 9 | B | × | × |

VIRTUAL DISK CONFIGURATION MANAGEMENT TABLE 900A

FIG.10A

POOL DEDUPLICATION SETTING SCREEN 1000

| POOL ID 1010 | DEDUPLICATION SETTING 1020 |
|---|---|
| A | ● ON   ○ OFF |
| B | ● ON   ○ OFF |

FIG.20

| 2010A | 2020A | 2030A |
|---|---|---|
| MIGRATION SOURCE LOGICAL SEGMENT ID | MIGRATION DESTINATION PHYSICAL SEGMENT ID | LUN |
| 5 | 1 | 3 |

REAL DATA COMPARISON TABLE 2000A

FIG.21

| 2110A | 2120A | 2130A |
|---|---|---|
| PHYSICAL SEGMENT ID | ACCESS FREQUENCY | FINAL ACCESS TIME |
| 1 | 1000 | 2012/01/31 18:30:00 |
| 2 | 100 | 2011/10/01 17:00:00 |
| 3 | 10 | 2011/05/21 13:14:34 |
| 4 | 300 | 2012/02/01 12:34:56 |
| 5 | 0 | 2011/02/21 02:30:00 |

ACCESS HISTORY MANAGEMENT TABLE 2100A

STORAGE APPARATUS, STORAGE SYSTEM, AND DATA MIGRATION METHOD

TECHNICAL FIELD

The present invention relates to a storage apparatus, a storage system, and a data migration method, and, more particularly, is suitably applied to a storage apparatus, a storage system, and a data migration method with which data stored on a virtual disk is migrated to another pool area by using capacity virtualization technology and duplicate removal technology.

BACKGROUND ART

Typically, a storage apparatus is configured comprising a plurality of HDD (Hard Disk Drives) installed as an array and a control unit which performs control of a plurality of HDD operations thereof by means of a RAID (Redundant Array of Inexpensive Disks) system. Further, a storage apparatus provides a logical storage area, which is made redundant by the RAID system, to a host via a network such as a SAN (Storage Area Network). The logical storage area provided to the host is called a logical volume.

Conventionally, a user using a storage apparatus must determine an expected storage capacity which will be required in the future at the design stage of the storage apparatus and must pre-purchase an HDD for which no usage is planned at the design stage, and assign the HDD to a logical volume. There is therefore a problem in that initial costs increase.

Therefore, in recent years, in order to solve the problem of increased initial costs, advances have been made in developing the technology known as thin provisioning.

In a storage apparatus which comprises this thin provisioning, storage areas called pool areas are configured. A pool area is a set of storage areas which are configured from one or more RAID groups. Therefore, in the storage apparatus, virtual storage areas called virtual volumes are assigned from the pool areas. The virtual volumes are shared by a plurality of hosts.

During virtual volume assignment, in which the virtual volumes are assigned, only management information is set. Further, during writing, when data is actually written from a host, a storage area of the required storage capacity is dynamically assigned to the virtual volume. The units for storage capacity assignment which are dynamically assigned to the virtual volume are called logical segments. The storage capacity assignment units need not necessarily be of a fixed length size, rather, the size may change according to the storage apparatus type and user settings.

Thus, with thin provisioning, there is the advantage that no pre-purchase of the HDD which actually provide the storage areas is required at the storage apparatus design stage, and hence it is possible to curb any increase in the initial costs.

Further, as described earlier, in a storage apparatus which comprises thin provisioning, virtual volumes which are provided to a host are configured from virtualized logical segments. Meanwhile, pool areas, in which the storage areas of the logical segments are assigned to the virtual volumes, are configured from physical segments which are physical areas of a fixed size for storing data and to which actual storage capacity is assigned.

In a storage apparatus, the logical segments are managed in association with any of the physical segments stored in the storage apparatus. The host is able to access the physical segments associated with the logical segments via the logical segments by accessing the logical segments.

Moreover, in recent years, advances have been made in the development of technology for virtually constructing a plurality of hosts in a host. A virtually constructed host is known as a virtual machine.

Virtual machines are used with the object of alleviating the management burden and reducing costs by aggregating host resources. The disk area used by a virtual machine is stored as a virtual disk in a storage apparatus. Virtual disks include VMDK (Virtual Machine DisK format) by VMware, for example.

The host monitors the states of virtual disks and if the usage rate of a storage area is equal to or more than a fixed ratio or the response time by the storage apparatus is delayed, an operation to migrate the virtual disk to another storage resource (pool area, for example) is carried out in order to equalize the load on the storage apparatus. Such an operation can be realized by means of an SDRS (Storage Distributed Resource Scheduler) by VMware, for example, or the like.

PTL 1 discloses a duplicate removal technology which detects a data match for data stored in storage apparatuses by using hash values for each physical segment of a fixed size, and which, if a physical segment exhibiting data duplication is found, releases a remaining redundant physical segment other than a specific physical segment.

A pointer from a logical segment in the virtual volume associated with the released physical segment is changed so as to reference the remaining physical segment. By releasing the duplicate physical segment in this way, the storage capacity of the storage apparatus can be reduced.

Note that, the data duplicate determination may be executed for each fixed period among data which has already been stored in the storage apparatus, or a determination may be made, when data is written from a host to the storage apparatus, by comparing the data with data which has already been stored in the storage apparatus.

Further, the physical segment size may be an assignment size which is dynamically assigned by means of thin provisioning, for example, or may be a predetermined fixed size or variable length size. Typically, the smaller the size of the segment subjected to a data comparison, the higher the probability of a data match between physical segments.

PTL2 discloses technology for dynamically executing virtual disk migration. More specifically, when a virtual disk which is a data area of a virtual machine stored in the storage apparatus is migrated, a virtual disk snapshot is created by using snapshot technology. Further, after copying a migration-source virtual disk to a migration-destination virtual disk, virtual disk migration is executed dynamically by integrating update data which is recorded in the snapshot.

CITATION LIST

Patent Literature

PTL 1: U.S. Pat. No. 6,928,526
PTL 2: U.S. Patent Specification No. 2009/0037680

SUMMARY OF INVENTION

Technical Problem

When combining the duplication removal technology disclosed in PTL 1 with the virtual disk migration technology disclosed in PTL 2, the storage capacity used in the storage apparatus can be reduced. More specifically, a virtual disk stored in the storage apparatus is divided into segments of a size equal to or more than a few KB or so, data duplication between the segments is determined, and the remaining segment areas are released so that retain only a single segment is retained, whereby the storage capacity used in the storage apparatus can be reduced.

However, if a virtual disk is migrated to a different pool area in the storage apparatus which has undergone data duplication removal, all the data comprising the virtual disk must be transferred to the other pool area once the data has been restored to a state where data duplication removal has not been performed and duplication removal is executed once again in the pool area to which migration has been made.

Accordingly, all the data is transferred from the migration source to the migration destination even when duplicate data exists among the data comprising the virtual disk being migrated. As a result, a problem arises that, irrespective of whether a virtual disk must be migrated in order to alleviate the processing load of the storage apparatus, there is an increase in the processing load due to the virtual disk migration.

The present invention was conceived in view of the above points and provides a storage apparatus, a storage system, and a data migration method which enable the processing load to be alleviated.

Solution to Problem

In order to solve this problem, the present invention provides a storage apparatus, comprising a control unit which manages a plurality of virtual volumes which are provided to a host, and a plurality of pool areas in which storage areas are assigned to the plurality of virtual volumes, wherein the virtual volumes comprise virtual disks which store data from the host and the virtual disks comprise a plurality of logical segments, wherein the pool areas comprise real volumes which actually store data from the host and the real volumes comprise a plurality of physical segments, wherein the control unit manages the logical segments in the virtual disks in association with the physical segments in the pool areas, for each of the plurality of pool areas, and wherein, if one virtual disk which is associated with one pool area is migrated to another pool area which differs from the one pool area, the control unit executes duplicate determination of data in one virtual disk which is associated with one pool area, executes data duplicate determination between one virtual disk which is associated with the one pool area and the other pool area on the basis of the result of the duplicate determination, and migrates data which is stored in a logical segment that the one virtual disk comprises, excluding duplicate data, to the other pool area.

In order to solve this problem, the present invention provides a storage system, comprising a plurality of storage apparatuses which comprise virtual volumes which are provided to a host and pool areas in which storage areas are assigned to the virtual volumes, and a control unit which manages the plurality of storage apparatuses, wherein the virtual volumes comprise virtual disks which store data from the host and the virtual disks comprise a plurality of logical segments, wherein the pool areas comprise real volumes which actually store data from the host and the real volumes comprise a plurality of physical segments, wherein the control unit manages the logical segments in the virtual disks in association with the physical segments in the pool areas, for each of the plurality of pool areas, and wherein, if one virtual disk which is associated with one pool area of any one storage apparatus among the plurality of storage apparatuses is migrated to another pool area in another storage apparatus which differs from the one storage apparatus, the control unit executes duplicate determination of data in one virtual disk which is associated with the one pool area, executes a data duplicate determination between the one virtual disk which is associated with the one pool area and the other pool area on the basis of the result of the duplicate determination, and migrates data which is stored in a logical segment that the one virtual disk comprises, excluding duplicate data, to the other pool area.

In order to solve this problem, the present invention provides a data migration method for a storage apparatus which comprises a control unit which manages a plurality of virtual volumes which are provided to a host and a plurality of pool areas in which storage areas are assigned to the plurality of virtual volumes, wherein the virtual volumes comprise virtual disks which store data from the host and the virtual disks comprise a plurality of logical segments, and wherein the pool areas comprise real volumes which actually store data from the host and the real volumes comprise a plurality of physical segments, the data migration method comprising a first step in which the control unit manages the logical segments in the virtual disks in association with the physical segments in the pool areas, for each of the plurality of pool areas; and a second step in which, if one virtual disk which is associated with one pool area is migrated to another pool area which differs from the one pool area, the control unit executes duplicate determination of data in one virtual disk which is associated with the one pool area, executes a data duplicate determination between one virtual disk which is associated with the one pool area and the other pool area on the basis of the result of the duplicate determination, and migrates data which is stored in a logical segment that the one virtual disk comprises, excluding duplicate data, to the other pool area.

Advantageous Effects of Invention

According to the present invention, if data which is stored on a virtual disk which belongs to one pool area is migrated to another pool area, the processing load can be reduced by migrating the data while maintaining duplicate removal.

BRIEF DESCRIPTION OF DRAWINGS

FIG. 4A is a conceptual diagram showing a logical segment mapping table.

FIG. 4B is a conceptual diagram showing a logical segment mapping table.

FIG. 5A is a conceptual diagram showing a physical segment management table.

FIG. 5B is a conceptual diagram showing a physical segment management table.

FIG. 6A is a conceptual diagram showing a hash table.

FIG. 6B is a conceptual diagram showing a hash table.

FIG. 7 is a conceptual diagram showing an LU management table.

FIG. 8 is a conceptual diagram showing a pool information management table.

FIG. 9 is a conceptual diagram showing a virtual disk configuration management table.

FIG. 10A is a conceptual diagram showing a screen configuration of a pool duplicate removal setting screen.

FIG. 20 is a conceptual diagram showing a real data comparison table.

FIG. 21 is a conceptual diagram showing an access history management table.

DESCRIPTION OF EMBODIMENTS

An embodiment of the present invention will be described in detail hereinbelow with reference to the drawings.

(1) First Embodiment

(1-1) Storage System Configuration

Figure 1:
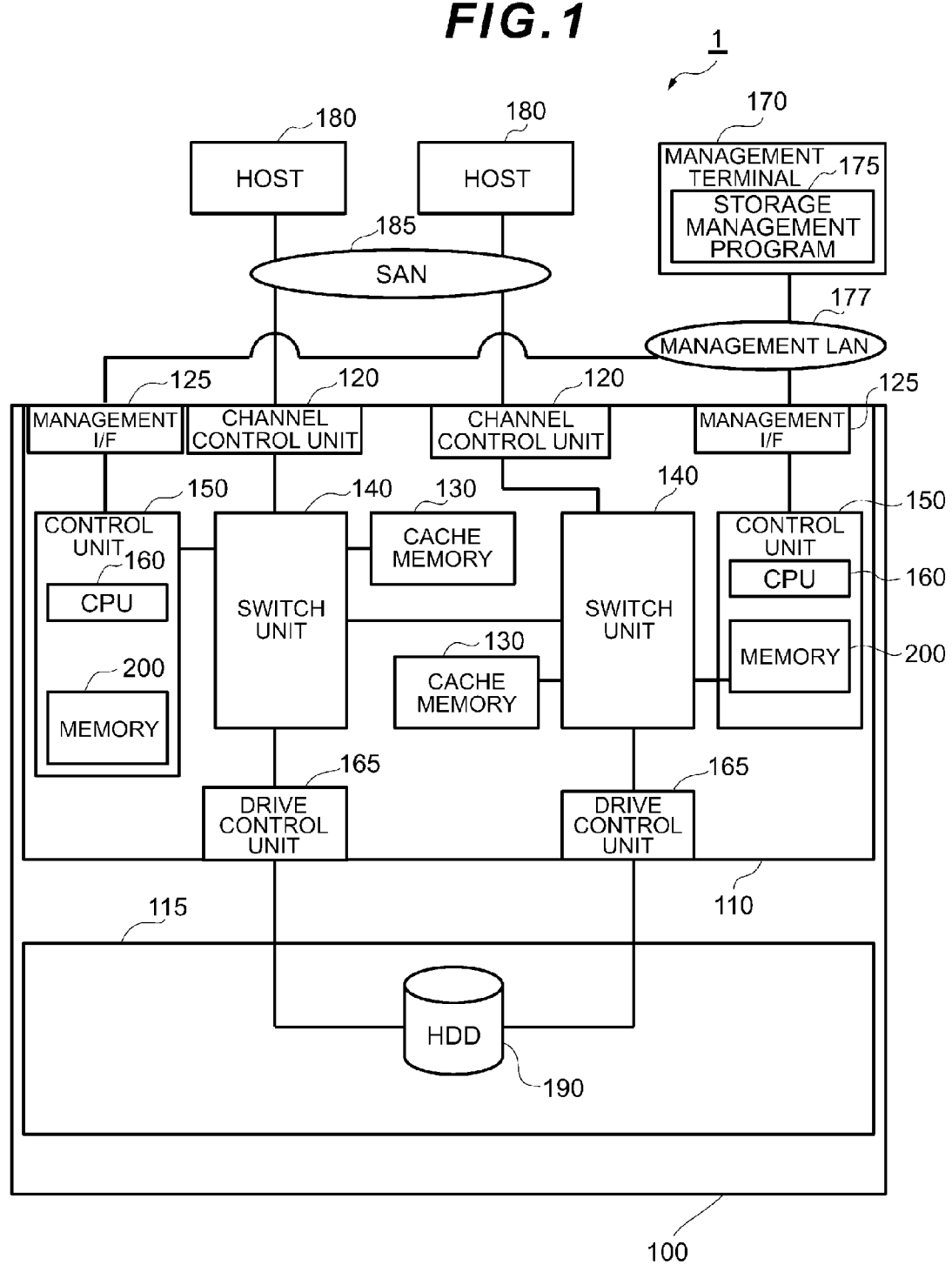
FIG. 1 is a conceptual diagram showing an overall configuration of a storage system.

FIG. 1 shows the overall configuration of a storage system 1. The storage system 1 is configured comprising a host 180, a storage apparatus 100, and a management terminal 170. Further, in the storage system 1, the host 180 and the storage apparatus 100 are connected via a SAN (Storage Area Network) 185, and the storage apparatus 100 and the management terminal 170 are connected via a management LAN (Local Area Network) 177.

The host 180 transmits a read request or a write request to the storage apparatus 100 via the SAN 185. Further, the host 180 transmits a control request to the storage apparatus 100.

The storage apparatus 100 is configured comprising a controller unit 110 and a storage device unit 115. The controller unit 110 is configured comprising a channel control unit 120, a management I/F 125, a control unit 150, a switch unit 140, a cache memory 130, and a drive control unit 165. Further, the storage device unit 115 is configured comprising a plurality of HDD (Hard Disk Drive) 190.

The channel control unit 120 receives various data which is transmitted from the host 180 via the SAN 185 and transmits various data to the host 180.

The management I/F 125 receives the management information or a management request of the storage apparatus 100 transmitted from the management terminal 170 via the management LAN 177 and transmits the management information or the management request to the management terminal 170.

The control unit 150 is configured comprising a CPU (Central Processing Unit) 160 and a memory 200.

The CPU 160 controls I/Os of various information of the storage apparatus 100 and various data which is sent and received by the channel control unit 120 and the management I/F 125. Further, the CPU 160 centrally controls the operation of the controller unit 110 by means of co-operation between various programs or various tables which are stored in the memory 200.

The switch unit 140 performs processing to transfer various data in the controller unit 110.

The cache memory 130 temporarily stores various data from the host 180 or the management terminal 170.

The drive control unit 165 is an interface circuit for communications between the controller unit 110 and the storage device unit 115. The drive control unit 165 performs processing to write data to the HDD 190 or processing to read data from the HDD 190 on the basis of the control by the controller unit 110.

The storage device unit 115 is configured comprising a plurality of HDD 190 of one or more types. Note that, here, [the storage device unit 115] is configured comprising only the HDD 190 but is not limited to such a configuration, rather, [the storage device unit 115] may also be configured comprising, instead of the HDD 190, SSD (Solid State Drive), SAS, SATA, a flash memory device, or an optical drive. Further, the storage device unit 115 stores various information of the storage apparatus 100 and various data on the basis of an instruction from the drive control unit 165.

The management terminal 170 is configured comprising a storage management program 175 in a memory (not shown), and makes various settings of the storage apparatus 100 on the basis of this storage management program 175.

Figure 2:
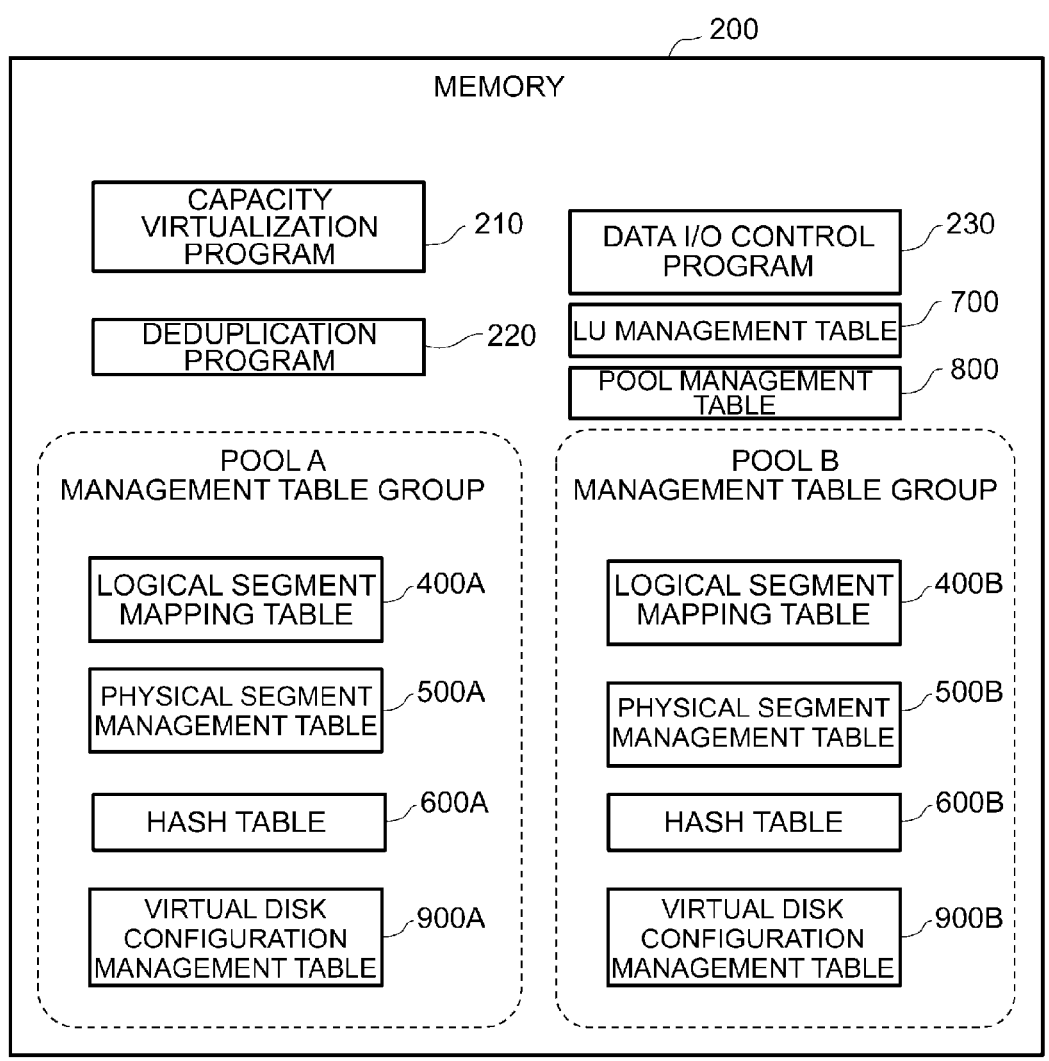
FIG. 2 is a conceptual diagram showing a functional configuration of a memory.

FIG. 2 shows a functional configuration of the memory 200. The memory 200 is configured comprising information required to control the storage apparatus 100. More specifically, the memory 200 is configured comprising a capacity virtualization program 210, a duplicate removal program 220, a data I/O control program 230, an LU management table 700, a pool management table 800, a pool A management table group, and a pool B management table group.

The pool A management table group is configured comprising a logical segment mapping table 400A, a physical segment management table 500A, a hash table 600A, and a virtual disk configuration management table 900A.

The pool B management table group is configured comprising a logical segment mapping table 400B, a physical segment management table 500B, a hash table 600B, and a virtual disk configuration management table 900B.

Figure 3:
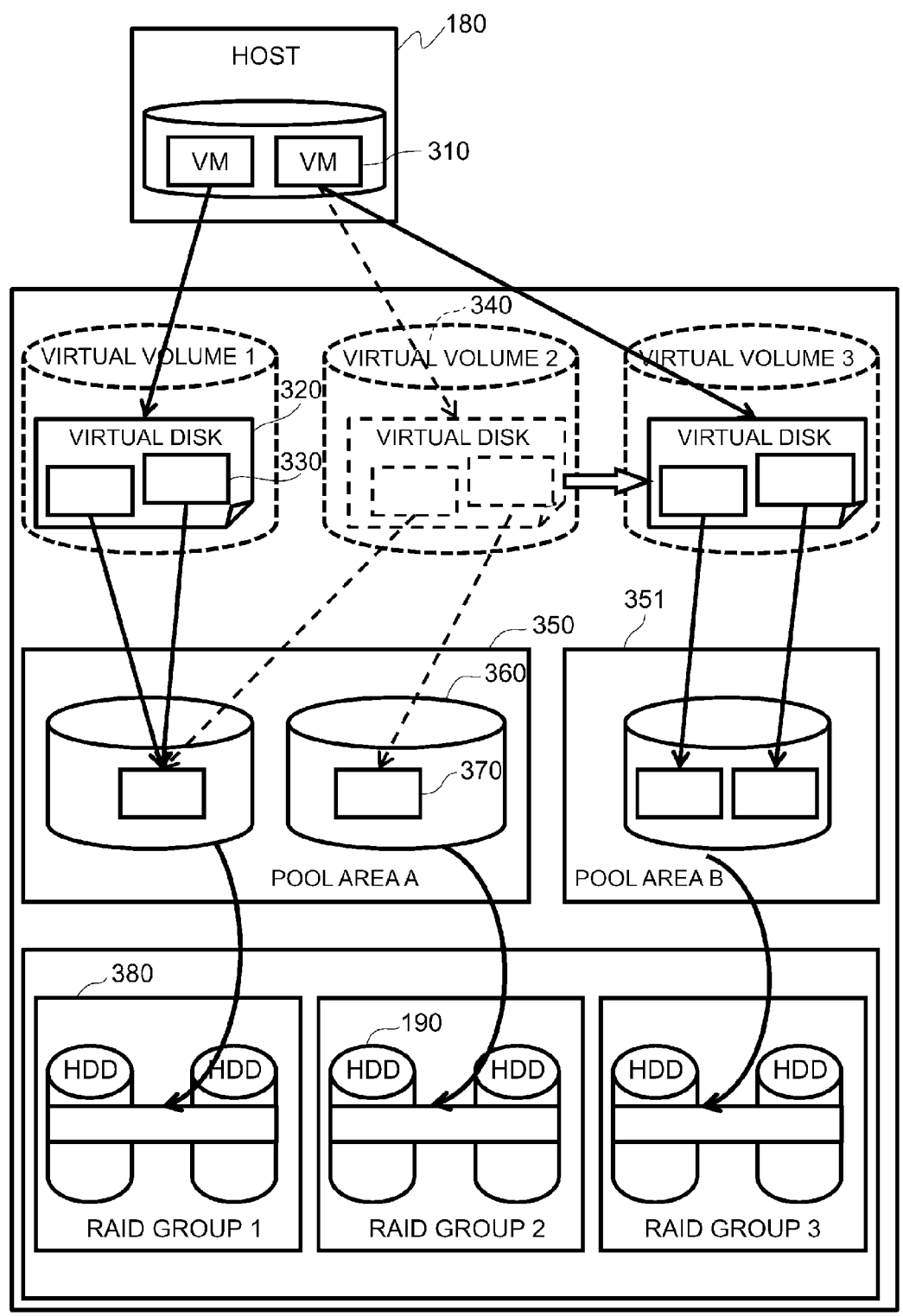
FIG. 3 is a conceptual diagram of a logical configuration of the storage system.

FIG. 3 shows a logical configuration of the storage system 1. The storage device unit 115 forms a single RAID group 380 from a plurality of HDD 190 and forms one or more real volumes 360 from a single RAID group 380. Further, the storage device unit 115 forms a pool area 350 as a storage area configured from one or more real volumes 360.

The storage apparatus 100 provides a virtual volume 340 which is a virtual storage area to the host 180. The virtual volume 340 has a preset storage capacity but the storage capacity which is actually consumed is associated with the virtual volume 340 in segment units which are storage area assignment units from the real volume 360 in the pool area 350 when a write request is generated by the host 180. Accordingly, a relationship is established where a logical segment 330 in a virtual disk 320 of the virtual volume 340 is associated with a physical segment 370 in the real volume 360 of the pool area 350.

In a server virtualization environment, a plurality of virtual machines (VM) 310 are run on the host 180. The data of the virtual machines 310 is stored as the virtual disk 320 in the virtual volume 340 of the storage apparatus 100. The virtual disk 320 is managed divided into segment units in the storage apparatus 100. The virtual disk 320 is provided as a VMDK (Virtual Machine DisK) which is used by VMware's VMware or as a VHD (Virtual Hard Disk) which is used by Microsoft's Hyper-V, for example.

FIG. 3 shows an overview of processing in which, in response to an increase in the load due to a case where there is an increase in the access frequency to a pool area A by a virtual disk 320 which is a pool area of the virtual machine 310 which runs on the host 180, migration is performed to another pool area B of the storage apparatus 100 in order to equalize the load. For example, if there is going to be a delay in the response time for access to the virtual disk 320 stored in a virtual volume 2 which belongs to the pool area A of the storage apparatus 100, the host 180 migrates the virtual disk 320 of the virtual machine 310 to the virtual volume 3 which belongs to the other pool area B in order to perform load distribution using a small-load storage resource (pool area).

Note that, using duplicate removal technology, the storage apparatus 100 determines whether there is a match between physical segment data by calculating and comparing data hash values in physical segment 370 units and, if the same data exist, retains a single physical segment 370, releases the area of the physical segment 370 storing the other identical data, and performs management to change the reference pointer from the logical segment 330 associated with the released physical segment 370 so that this reference pointer refers to the remaining physical segment 370, thereby reducing the amount of data stored in the storage apparatus 100.

(1-2) Configuration of Various Tables

FIG. 4A shows a conceptual diagram of a logical segment mapping table 400A. The logical segment mapping table 400A is a management table for managing, among the plurality of pool areas 350, a physical segment 370 of pool area A in association with a logical segment 330.

The logical segment mapping table 400A is configured from a logical segment ID field 410A, a physical segment ID field 420A, a LUN field 430A, and a logical address field 440A.

The logical segment ID field 410A stores identifiers for uniquely identifying logical segments 330 in the virtual volume 340 of the storage apparatus 100.

The physical segment ID field 420A stores identifiers for uniquely identifying physical segments 370 which store data of the logical segment ID field 410A which is information for associating the logical segment ID field 410A with the physical segment ID field 420A.

The LUN field 430A stores identifiers for uniquely identifying virtual volumes 340 in the storage apparatus 100 which is information for identifying the virtual volumes to which the logical segments 330 belong.

The logical address field 440A stores address information for identifying where in the virtual volumes 340 of the storage apparatus 100 the logical segments 330 are located and stored from the perspective of the host 180.

FIG. 4B shows a conceptual diagram of the logical segment mapping table 400B. The logical segment mapping table 400B is a management table for managing, among the plurality of pool areas 350, the physical segments 370 of pool area B in association with the logical segments 330. The fields comprising the logical segment mapping table 400B are each the same as each of the fields comprising the logical segment mapping table 400A, and hence a description is omitted here.

Note that, in the following description, if there is no particular distinction made between the logical segment mapping table 400A and the logical segment mapping table 400B, the two tables are referred to collectively as the logical segment mapping tables 400.

FIG. 5A shows a conceptual diagram of the physical segment management table 500A. The physical segment management table 500A is a management table for managing physical segments of the pool area A among the plurality of pool areas 350.

The physical segment management table 500A is configured from a physical segment ID field 510A, a hash ID field 520A, a reference counter field 530A, and a physical address field 540.

The physical segment ID field 510A stores identifiers for uniquely identifying physical segments 370 in the storage apparatus 100.

The hash ID field 520A stores identifiers for uniquely identifying hash values of the data stored in the physical segment ID field 510A.

The reference counter field 530A stores numerical values indicating the importance of the physical segments 370. The importance means the number of logical segments 330 holding data which is stored in a certain physical segment 370, and how many logical segments 330 the physical segments 370 are referenced by is indicated through the recording of correspondence relationships in the logical segment mapping tables 400.

The physical address field 540A stores address information for identifying where in the pool areas 350 and RAID groups 380 of the storage apparatus 100 the logical segments 330 are located and stored.

FIG. 5B shows a conceptual diagram of the physical segment management table 500B. The physical segment management table 500B is a management table for managing the physical segments of the pool area B among the plurality of pool areas 350. The fields comprising the physical segment management table 500B are the same as each of the fields comprising the physical segment management table 500A and hence a description is omitted here.

Note that, in the following description, if there is no particular distinction made between the physical segment management table 500A and the physical segment management table 500B, these two tables are referred to collectively as physical segment management tables 500.

FIG. 6A shows a conceptual diagram of a hash table 600A. The hash table 600A is a management table for managing the hash values of pool A among the plurality of pool areas 350.

The hash table 600A is configured from a hash ID field 610A and a hash value field 620A.

The hash ID field 610A stores identifiers for uniquely identifying hash values stored in the hash value field 620A in the pool areas 350.

The hash value field 620A stores hash-calculated values for data stored in segments of the storage apparatus 100.

FIG. 6B shows a conceptual diagram of the hash table 600B. The hash table 600B is a management table for managing hash values of the pool area B among the plurality of pool areas 350. The fields comprising the hash table 600B are each the same as each of the fields comprising the hash table 600A and hence a description is omitted here.

Note that, in the following description, if there is no particular distinction made between the hash table 600A and the hash table 600B, these two tables are referred to collectively as the hash tables 600.

FIG. 7 shows a conceptual diagram of the LU management table 700. The LU management table 700 is configured from a LUN field 710, a pool ID field 720, and an LU duplicate removal setting field 730.

The LUN field 710 stores identifiers for uniquely identifying the virtual volumes 340 which are managed in the storage apparatus 100.

The pool ID field 720 stores identifiers for uniquely identifying pool areas 350 to which the virtual volumes 340 identified in the LUN field 710A belong.

The LU duplicate removal setting field 730 stores a duplicate removal function valid/invalid setting for the virtual volumes 340 identified in the LUN field 710.

FIG. 8 shows a conceptual diagram of the pool management table 800. The pool management table 800 is configured from a pool ID field 810 and a pool duplicate removal setting field 820.

The pool ID field 810 stores identifiers for uniquely identifying the pool areas 350 in the storage apparatus 100.

The pool duplicate removal setting field 820 stores a duplicate removal function valid/invalid setting for the pool areas 350 identified in the pool ID field 810. In order to turn ON (validate) the setting which is stored in the LU duplicate removal setting field 730, the pool duplicate removal setting field 820 of the pool ID field 810 to which the LU belongs is set to ON (validated).

FIG. 9 shows a conceptual diagram of a virtual disk configuration management table 900A. The virtual disk configuration management table 900A is configured from a logical segment ID field 910A, a hash value field 920A, a comparison target attribute field 930A, and a migration target attribute field 940A.

The logical segment ID field 910A stores identifiers of the logical segments 330 comprising the virtual disks 320.

The hash value field 920A stores hash values of data which is stored in the logical segments 330 identified in the logical segment ID field 910A.

The comparison target attribute field 930A stores attribute values for identifying whether the hash value of the data stored in the logical segment 330 identified in the logical segment ID field 910A is a target of a comparison with the hash value stored in the hash table 600 of the migration-destination pool area 350 of the virtual disk 320.

Figure 12:
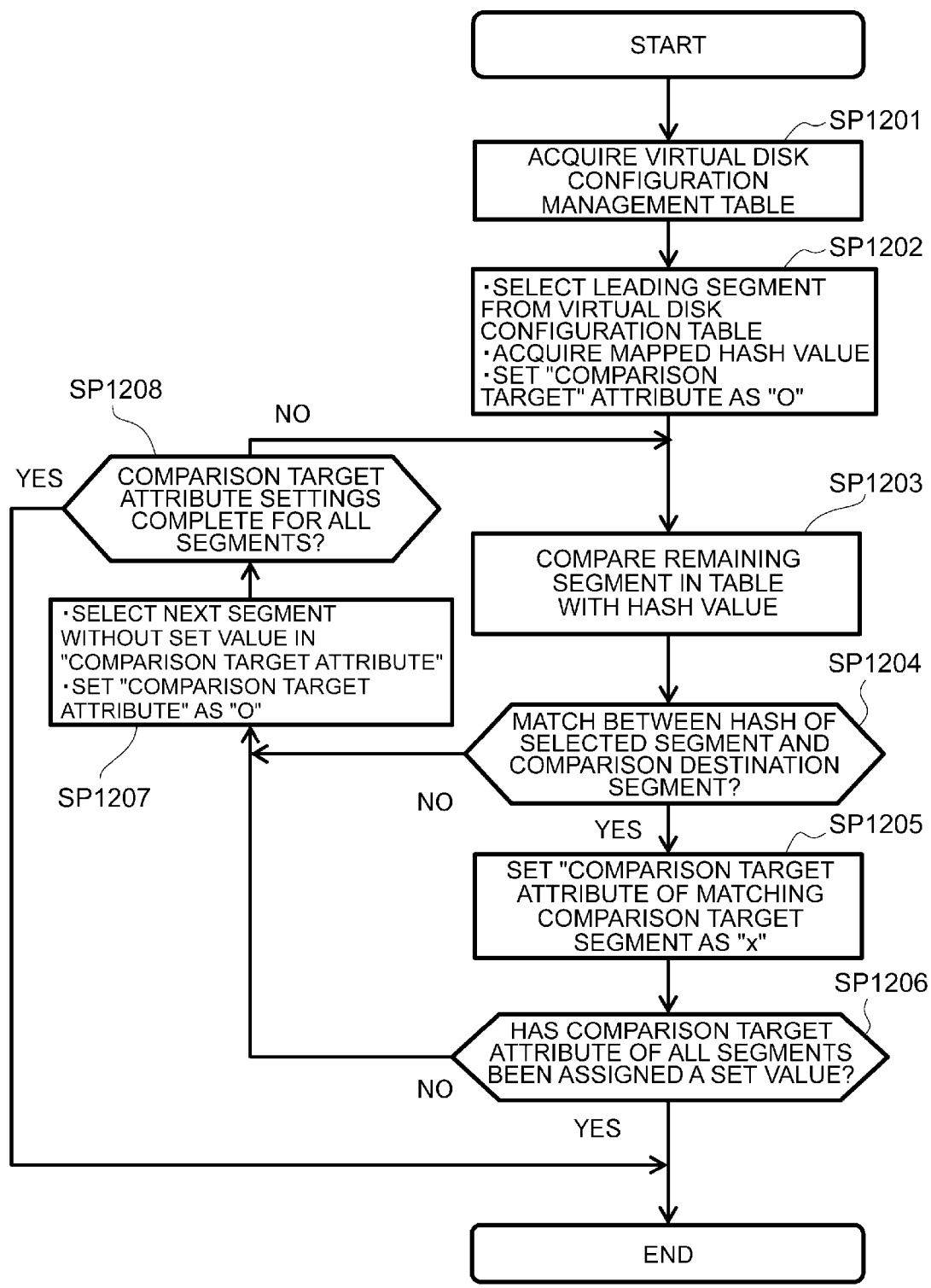
FIG. 12 is a flowchart showing virtual disk duplicate determination processing.

The value of the comparison target attribute field 930A is stored as a result of the virtual disk duplicate determination processing shown in FIG. 12. In this embodiment, the value "o" is stored in a logical segment serving as a comparison target and the value "x" is stored for a logical segment other than a comparison target.

The migration target attribute field 940A stores an attribute value for identifying whether, among the logical segments for which the value "o" is stored in the comparison target attribute field 930, [a logical segment] is actually a target for migrating data to the migration-destination pool area 350.

Figure 13:
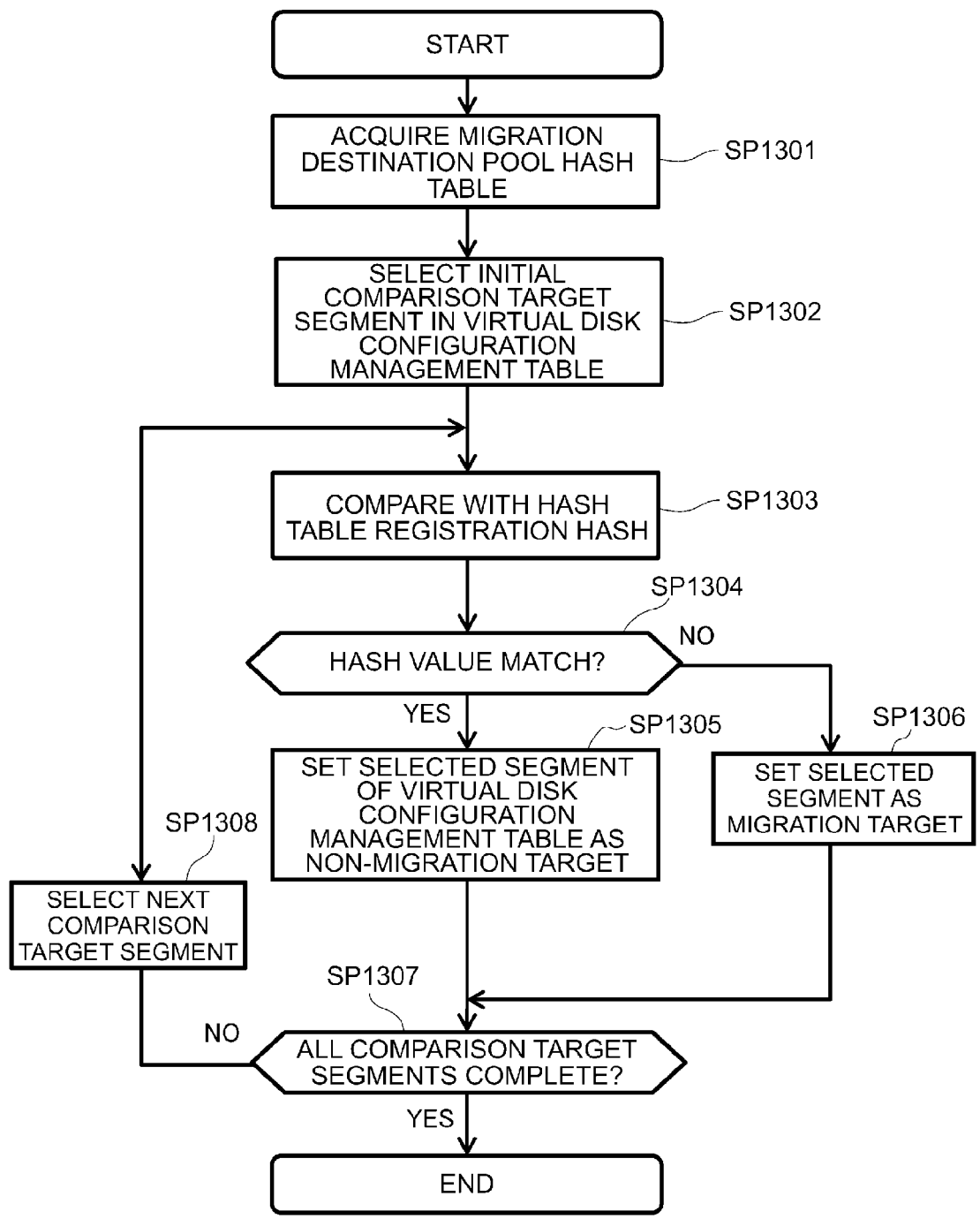
FIG. 13 is a flowchart showing pool duplicate determination processing.

The value of the migration target attribute value 940A is set as a result of the pool duplicate determination processing shown in FIG. 13. In this embodiment, the value "o" is stored for logical segments which are migration targets and the value "x" is stored for logical segments other than comparison targets.

Note that, the virtual disk configuration management table 900B is similar to the virtual disk configuration management table 900A and hence illustrations and a description thereof are omitted here. Further, in the following description, if there is no particular distinction made between the virtual disk configuration management table 900A and the virtual disk configuration management table 900B, the two tables are referred to collectively as the virtual disk configuration management tables 900.

(1-3) Various Screen Configurations

FIG. 10A shows a pool duplicate removal setting screen 1000. The pool duplicate removal setting screen 1000 is a setting screen enabling the user of the storage apparatus 100 to make duplicate removal-related settings by means of the storage management program 175 of the management terminal 170.

The pool duplicate removal setting screen 1000 is configured from a pool ID field 1010 and a duplicate removal setting field 1020.

The pool ID field 1010 displays a list of identifiers of the pool areas 350 which are targets for duplicate removal settings.

The duplicate removal setting field 1020 provides a display enabling the selection of a setting determining whether duplicate removal is validated for the pool areas 350 which are displayed in the pool ID field 1010. If validated, the user is able to select "ON" and, if made invalid, the user is able to select "OFF."

Figure 10B:
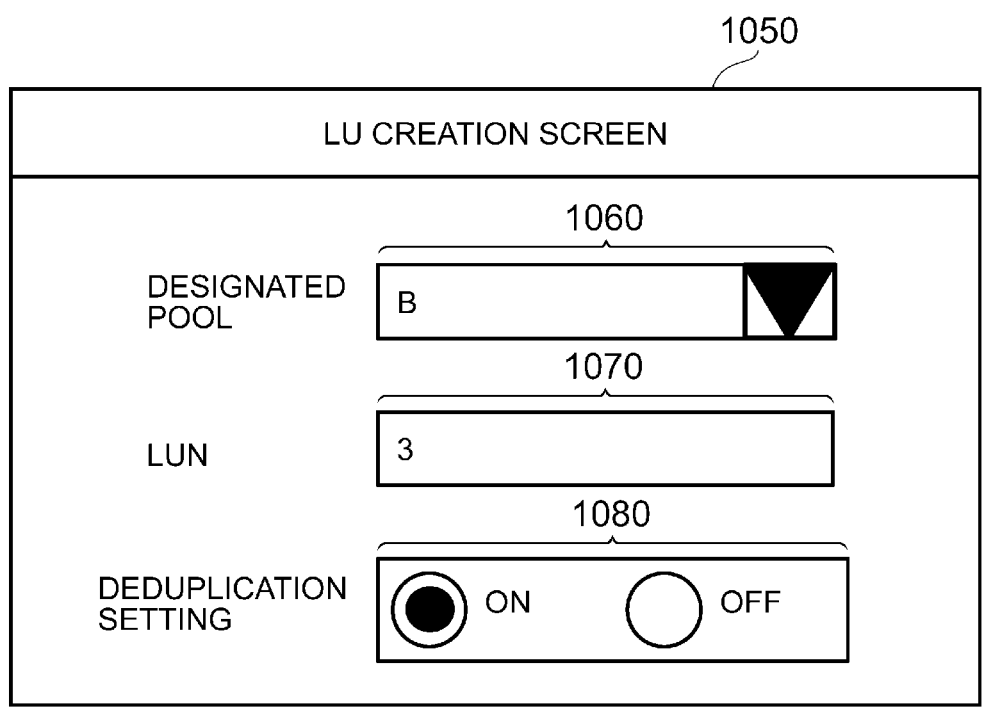
FIG. 10B is a conceptual diagram showing a screen configuration of an LU creation screen.

FIG. 10B shows an LU creation screen 1050. The LU creation screen 1050 is a creation screen enabling the user of the storage apparatus 100 to make an LU-creation-related setting by means of the storage management program 175 of the management terminal 170.

The LU creation screen 1050 is configured from a designed pool field 1060, a LUN field 1070, and a duplicate removal setting field 1080.

The designated pool field 1060 selectably displays the pool area 350 from which the capacity of the virtual volume (LU) being created is to be taken. The user is able to select one pool area 350 among the pool areas 350 in the storage apparatus 100 using pulldown format.

The LUN field 1070 displays identifiers which can be set for the LU being created. The user displays a list of LUN which already exist in the storage apparatus 100 on the setting screen and is able to set a number or other identifier so that there is no LUN duplicate. Further, LUN candidates of the storage apparatus 100 may also be displayed and selected by the user.

The duplicate removal setting field 1080 selectably displays a setting determining whether the duplicate removal setting is validated for the LU being created. If validated, the user is able to select "ON," and if made invalid, the user is able to select "OFF."

(1-4) Various Processing

Figure 11:
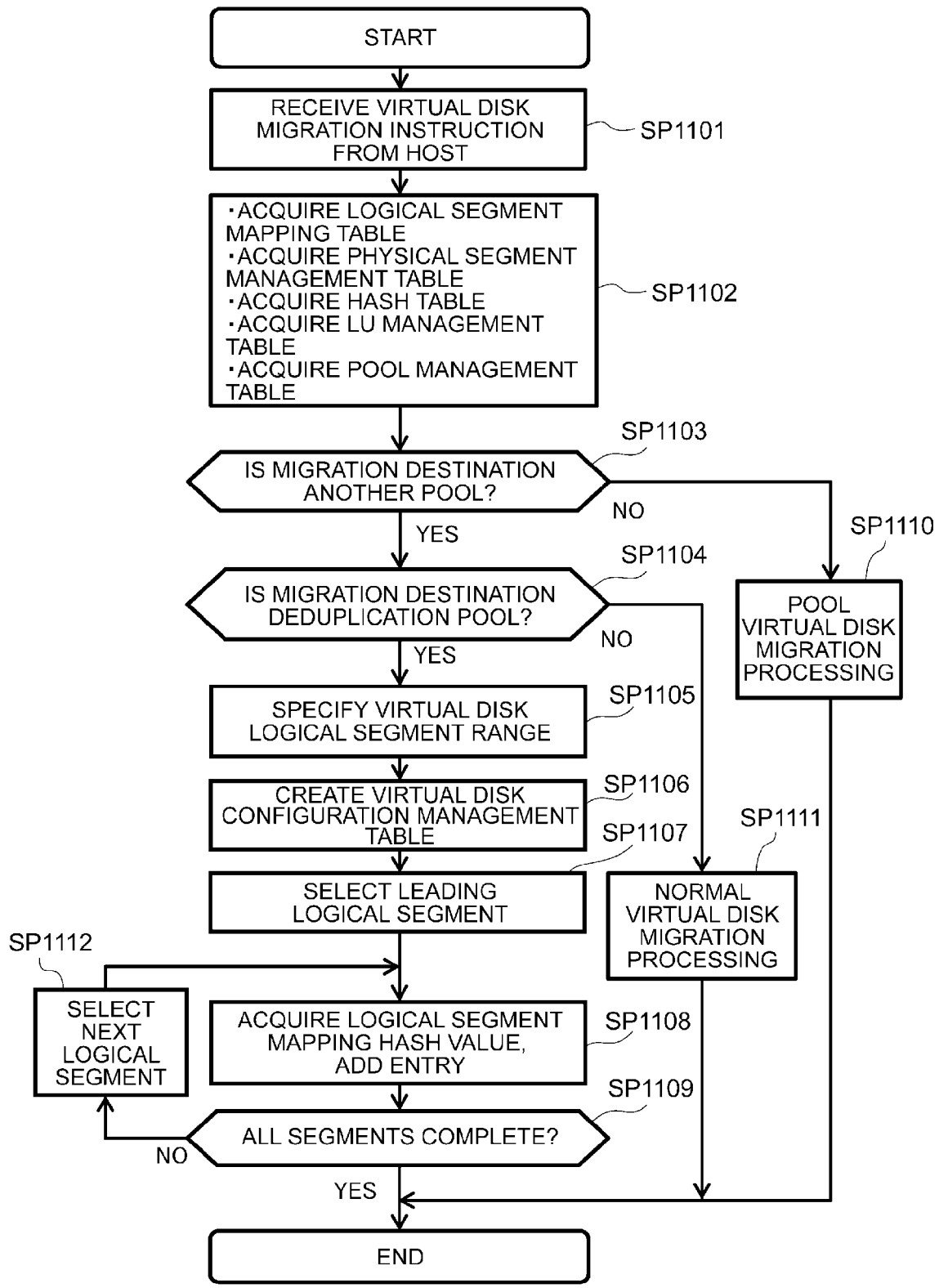
FIG. 11 is a flowchart showing virtual disk configuration information creation processing.

FIG. 11 shows a processing routine for virtual disk configuration information creation processing. The virtual disk configuration information creation processing is executed by means of co-operation between the CPU 160 of the control unit 150, the capacity virtualization program 210, the duplicate removal program 220, and the data I/O control program 230 which are stored in the memory 200. Further, the virtual disk configuration information creation processing is executed when a virtual disk migration instruction from the host 180 is received. Hereinbelow, for the sake of convenience in the description, the control unit 150 is described as the processing subject.

First, the control unit 150 receives a virtual disk migration instruction from the host 180 (SP1101).

The control unit 150 then acquires information of the logical segment mapping table 400, the physical segment management table 500, the hash table 600, the LU management table 700, and the pool management table 800 (SP1102).

The control unit 150 then acquires the migration destination of the virtual disk 320 which is designated by the virtual disk migration instruction received in step SP1101 and determines whether the migration destination of the acquired virtual disk 320 is a pool area 350 which differs from the pool area 350 to which the virtual disk 320 belongs (SP1103).

Typically, the host 180 transmits a virtual disk migration instruction, which designates a virtual volume 340 storing the migration source virtual disk 320 and a migration destination virtual volume 340, to the storage apparatus 100. Accordingly, the control unit 150 is able to determine each of the pool areas 350 to which the migration source virtual volume 340 and the migration destination virtual volume 340 belong on the basis of the LU management table 700, and is able to determine whether the migration destination is another pool area 350.

Upon obtaining a negative result in the determination of step SP1103, the control unit 150 executes migration processing of the virtual disk 320 in the same pool area 350 (SP1110), and ends the virtual disk configuration information creation processing. Note that, in step SP1110, the control unit 150 may migrate the migration target data to another virtual volume 340 in the same pool area 350, or may perform creation by migrating only the management information to another virtual volume 340 and may change and manage the pointer information for pre-migration data for the physical segment 370 storing the real data.

In contrast, upon obtaining an affirmative result in the determination of step SP1103, the control unit 150 determines whether the duplicate removal setting has been validated for the migration destination pool area 350 on the basis of the pool management table 800.

Upon receiving a negative result in this determination, the control unit 150 executes normal virtual disk migration processing (SP1111) and ends the virtual disk configuration information creation processing. Note that, in step SP1111, because a duplicate removal setting has not been made for the migration destination pool area 350, the control unit 150 executes processing to restore the original data from the migration source duplicate removal pool area 350 to a non-duplicate removal state, migrate all the data to the migration destination pool area 350, and delete the migration source data. However, the control unit 150 does not delete the physical segment 370 referenced by a logical segment 330 which is not a migration target, among the migrated physical segments 370.

If, on the other hand, an affirmative result is obtained in the determination of step SP1104, the control unit 150 specifies the logical segment range of the migration target virtual disks on the basis of the virtual disk migration instruction from the host 180 (SP1105).

Typically, the host 180 transmits a virtual disk migration instruction which designates a migration target data range to the storage apparatus 100. Accordingly, the control unit 150 is able to specify the ID of the logical segment 330 comprising the data of the designated range on the basis of the virtual disk migration instruction from the host 180.

The control unit 150 subsequently creates a virtual disk configuration management table 900 by sequentially storing the IDs of the logical segments specified in step SP1105 in the virtual disk configuration management table 900 on the basis of the data configuration of the migration target virtual disk 320 (SP1106).

The control unit 150 then selects the leading logical segment 330 of the virtual disk configuration management table 900 created in step SP1106 (SP1107).

The control unit 150 subsequently stores the hash value of the data stored in the logical segment 330 selected in step SP1107 in the hash value field 920 of the virtual disk configuration management table 900 (SP1108).

More specifically, the control unit 150 specifies the corresponding physical segment ID on the basis of the ID of the logical segment selected in step SP1107 and logical segment mapping table 400, specifies the corresponding hash ID on the basis of the specified physical segment ID and the physical segment management table 500, and acquires the corresponding hash value on the basis of the specified hash ID and the hash table 600. Further, the control unit 150 stores the acquired hash value in the hash value field 920 of the virtual disk configuration management table 900.

The control unit 150 then determines whether a corresponding hash value has been stored for all logical segment IDs registered in the virtual disk configuration management table 900 (SP1109).

Upon obtaining a negative result in the determination, the control unit 150 selects the next logical segment ID registered in the virtual disk configuration management table 900 as a processing target (SP1112), and migrates to step SP1108 to execute the abovementioned processing.

If, on the other hand, an affirmative result is obtained in the determination of step SP1109, the control unit 150 determines that the processing of all the entries is complete and that correspondence between the logical segment ID and the hash value in the virtual disk configuration management table 900 is stored, and ends the virtual disk configuration information creation processing.

FIG. 12 shows a processing routine for virtual disk duplicate determination processing. The virtual disk duplicate determination processing is executed by means of the co-operation between the CPU 160 of the control unit 150 and the capacity virtualization program 210 and the duplicate removal program 220 which are stored in the memory 200. Further, the virtual disk duplicate determination processing is executed following the virtual disk configuration information creation processing illustrated in FIG. 11. Hereinbelow, for the sake of convenience in the description, the control unit 150 is described as the processing subject.

First, the control unit 150 acquires the virtual disk configuration management table 900 (SP1201).

The control unit 150 then selects the leading logical segment ID stored in the acquired virtual disk configuration management table 900, acquires the hash value corresponding to the selected logical segment ID, and sets o in the comparison target attribute field 930 (SP1202).

The control unit 150 subsequently executes a comparison determination to determine whether there is a match between the hash value acquired in step SP1202 and the hash value of the remaining logical segment which is stored in the virtual disk configuration management table 900 (SP1203).

Note that, in step SP1203, the control unit 150 sequentially compares, among the logical segment IDs registered in the virtual disk configuration management table 900, hash values corresponding to the logical segment IDs selected in step SP1202 or step SP1208 and the hash values stored in the entries of the remaining logical segment IDs where an o or x attribute value has not yet been stored as a comparison target attribute.

The control unit 150 subsequently determines whether a matching hash value exists in the comparison determination of step SP1203 (SP1204).

Upon obtaining a negative result in this determination, the control unit 150 selects, among the logical segment IDs stored in the virtual disk configuration management table 900, the next logical segment ID for which no attribute value has been set in the comparison target attribute field 930, as a processing target, and sets o in the comparison target attribute field 930 of the selected logical segment ID (SP1207).

Further, the control unit 150 determines whether the comparison target attribute field 930 has been set for all the logical segment IDs stored in the virtual disk configuration management table 900 (SP1208).

Upon obtaining a negative result in this determination, the control unit 150 moves to step SP1203. If, on the other hand, an affirmative result is obtained in this determination, the control unit 150 ends the virtual disk duplicate determination processing.

Returning to step SP1204, upon obtaining an affirmative result in the determination of step SP1204, the control unit 150 sets an x in the comparison target attribute field 930 of logical segment IDs with matching hash values (SP1205).

Note that, in step SP1205, the control unit 150 sets an x for the value of the comparison target attribute field 930 of the entry of all the logical segment IDs for which the comparison result yielded a match, in the virtual disk configuration management table 900. Further, for all the logical segments for which an x is set in the comparison target attribute field 930, duplicate data exists in the virtual disk 320 being migrated but data is not actually migrated. Accordingly, the control unit 150 also sets an x as an attribute value for the migration target attribute field 940 of the entry for which an x is set in the comparison target attribute field 930.

The control unit 150 then determines whether either an o or x value has been set in the comparison target attribute value 930 for all the logical segment IDs registered in the virtual disk configuration management table 900 (SP1206).

Upon obtaining a negative result in this determination, the control unit 150 migrates to step SP1207. If, on the other hand, an affirmative result is obtained in this determination, the control unit 150 ends the virtual disk duplicate determination processing.

FIG. 13 shows a processing routine for pool duplicate determination processing. The pool duplicate determination processing is executed by means of co-operation between the CPU 160 of the control unit 150, the capacity virtualization program 210, the duplicate removal program 220, and the data I/O control program 230 which are stored in the memory 200. Further, the pool duplicate determination processing is executed after the virtual disk duplicate determination processing illustrated in FIG. 12. Hereinbelow, for the sake of convenience in the description, the control unit 150 is described as the processing subject.

First, the control unit 150 acquires the hash table 600 of the migration destination pool area 350 (SP1301).

The control unit 150 subsequently selects the initial entry for which o has been set in the comparison target attribute field 930 from the entry list of logical segment IDs registered in the virtual disk configuration management table 900 (SP1302).

The control unit 150 then compares the hash value of the logical segment ID selected in step SP1302 with the hash value registered in the hash table 600 of the migration destination pool area 350 (SP1303).

The control unit 150 then determines whether there is a match between the hash value of the logical segment ID selected in step SP1302 and any hash value registered in the hash table 600 of the migration destination pool area 350 (SP1304).

Upon obtaining a negative result in this determination, the control unit 150 sets the data stored in the logical segment with the logical segment ID selected in step SP1302, as the migration target. More specifically, the control unit 150 sets o in the migration target attribute field 940 in the virtual disk configuration management table 900 (SP1306).

Further, the control unit 150 extracts all the logical segments for which o has been set in the comparison target attribute field 930 in the virtual disk configuration management table 900 and determines whether either an o or x attribute value has been set in the migration target attribute field 940 (SP1307).

Upon obtaining an affirmative result in this determination, the control unit 150 ends the pool duplicate determination processing. If, on the other hand, a negative result is obtained in this determination, the control unit 150 selects, as a processing target, the next comparison target segment for which neither an o nor an x attribute value has been set in the migration target attribute field 940 (SP1308), and moves to step SP1303.

Returning to step SP1304, upon obtaining an affirmative result in the determination of step SP1304, the control unit 150 sets the logical segment ID of the virtual disk configuration management table 900 selected in step SP1302 as a non-migration target logical segment. More specifically, the control unit 150 sets an x in the migration target attribute field 940 in the virtual disk configuration management table 900 (SP1305).

Further, upon moving to step SP1307, the control unit 150 extracts all the logical segments for which o has been set in the comparison target attribute field 930 of the virtual disk configuration management table 900 as described earlier, and determines whether either an o or an x attribute value has been set in the migration target attribute field 940 (SP1307). Further, upon obtaining a negative result in this determination, the control unit 150 moves to step SP1308, and, upon obtaining a negative result in this determination, the control unit 150 ends the pool duplicate determination processing.

Figure 14:
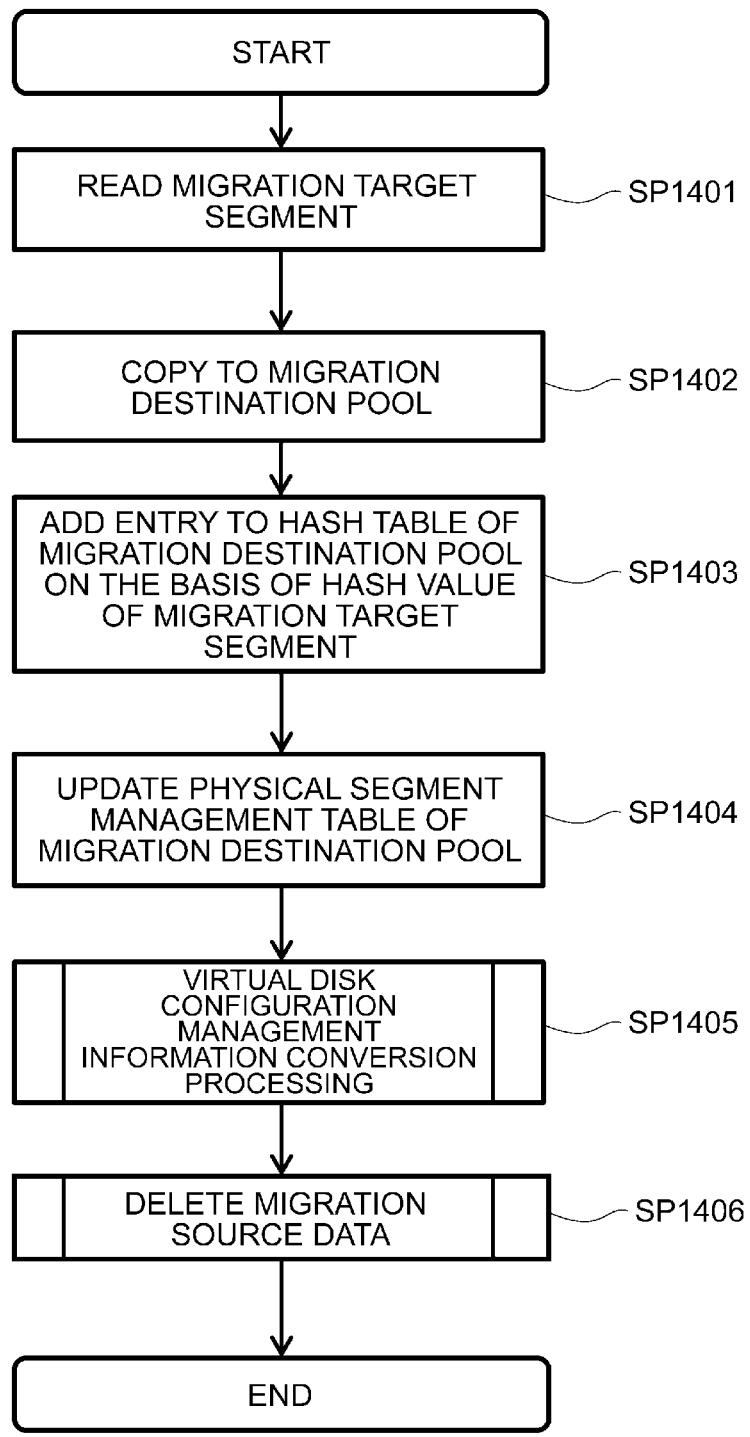
FIG. 14 is a flowchart showing pool data migration processing.

FIG. 14 shows a processing routine for pool data migration processing. This pool data migration processing is executed by means of co-operation between the CPU 160 of the control unit 150 and the capacity virtualization program 210, the duplicate removal program 220, and the data I/O control program 230 which are stored in the memory 200. Further, the pool data migration processing is executed after the pool duplicate determination processing illustrated in FIG. 13.

The control unit 150 reads all the migration target logical segments for which an o has been stored in the migration target attribute field 940 on the basis of the virtual disk configuration management table 900 (SP1401).

The control unit 150 then copies data which is stored in the migration target logical segment read in step SP1401 to the migration destination pool area 350 (SP1402).

The control unit 150 then adds a hash value entry for the migration target logical segment to the hash table 600 of the migration destination pool area 350 on the basis of the hash value for the migration target logical segment (SP1403).

The control unit 150 then updates the physical segment management table 500 of the migration destination pool area 350 on the basis of the hash value of the migration target logical segment. More specifically, when data stored in the logical segment is copied to the migration destination pool area 350 in step SP1402, the control unit 150 newly assigns a physical segment 370 in the migration destination pool area 350. Further, because the hash value of the data stored in the newly assigned physical segment 370 is the same as the hash value of the data stored in the copied logical segment, the control unit 150 determines the hash ID of the hash value of the migration target logical segment in the virtual disk configuration management table 900 from the hash table 600, and registers the hash ID as the hash ID in the physical segment management table 500 (SP1404).

The control unit 150 then executes virtual disk configuration information conversion processing (SP1405).

The control unit 150 then executes migration source data deletion processing (SP1406), and ends the pool data migration processing.

Figure 15:
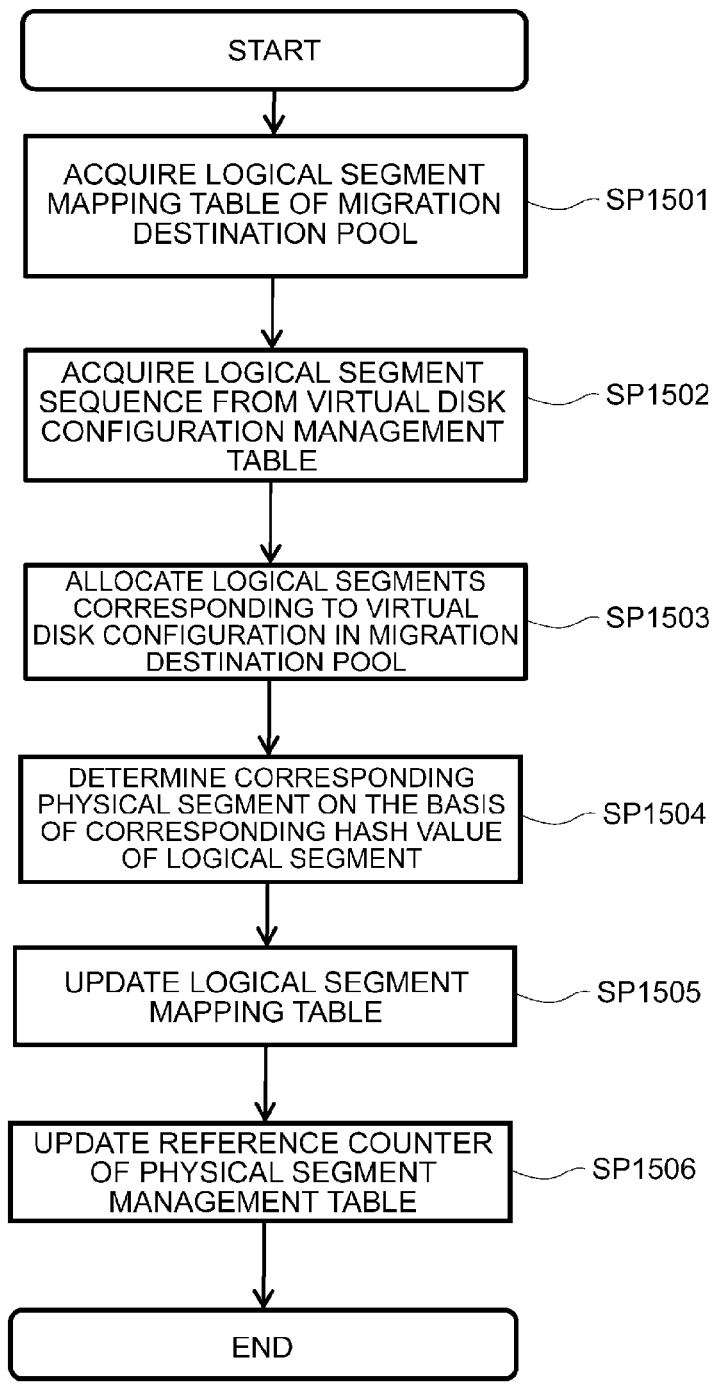
FIG. 15 is a flowchart showing virtual disk configuration information conversion processing.

FIG. 15 shows a processing routine for virtual disk configuration information conversion processing. The virtual disk configuration information conversion processing is executed by means of co-operation between the CPU 160 of the control unit 150, and the capacity virtualization program 210 and the duplicate removal program 220 which are stored in the memory 200. Further, the virtual disk configuration information conversion processing is executed by the virtual disk configuration information conversion processing of FIG. 14.

First, the control unit 150 acquires the logical segment mapping table 400 of the migration destination pool area 350 (SP1501).

Thereafter, the control unit 150 acquires sequence information for the logical segment IDs comprising the virtual disk 320 being migrated, on the basis of the virtual disk configuration management table 900 (SP1502).

The control unit 150 then secures a logical segment 330 which is required for the configuration of the virtual disk 320 in the migration destination pool area 350 on the basis of the configuration information acquired in step SP1502 (SP1503).

The control unit 150 then specifies the corresponding hash ID from the hash table 600 on the basis of the hash value of the data stored in the migration target logical segment, and specifies the physical segment corresponding to the same hash value from the physical segment management table 500 (SP1504).

The control unit 150 updates the logical segment mapping table 400 on the basis of the correspondence relationship between the logical segment and physical segment specified in steps SP1501 to SP1504 (SP1505).

The control unit 150 then makes the number of logical segments 330 which have the same hash value the reference count for the corresponding physical segments 370 on the basis of the importance information determined by the virtual disk configuration management table 900, and configures the reference count in the reference counter field 530 in the physical segment management table 500 (SP1506), and then ends the virtual disk configuration information conversion processing.

For example, in the virtual disk configuration management table 900 of FIG. 9, the number of logical segments for which the hash value of the data corresponding to the logical segment ID field 910 is A is three. The physical segments 370 storing the data with this hash value do not exist in pool B prior to migration, and hence the logical segment IDs 4, 7, and 8 which store data with this hash value A refer to any of the same physical segments 370 in a duplicate-removed state. Accordingly, the control unit 150 stores 3 in the reference counter field 530 in the physical segment management table 500 for the physical segments 370 which are referenced by the logical segments 330.

Figure 16:
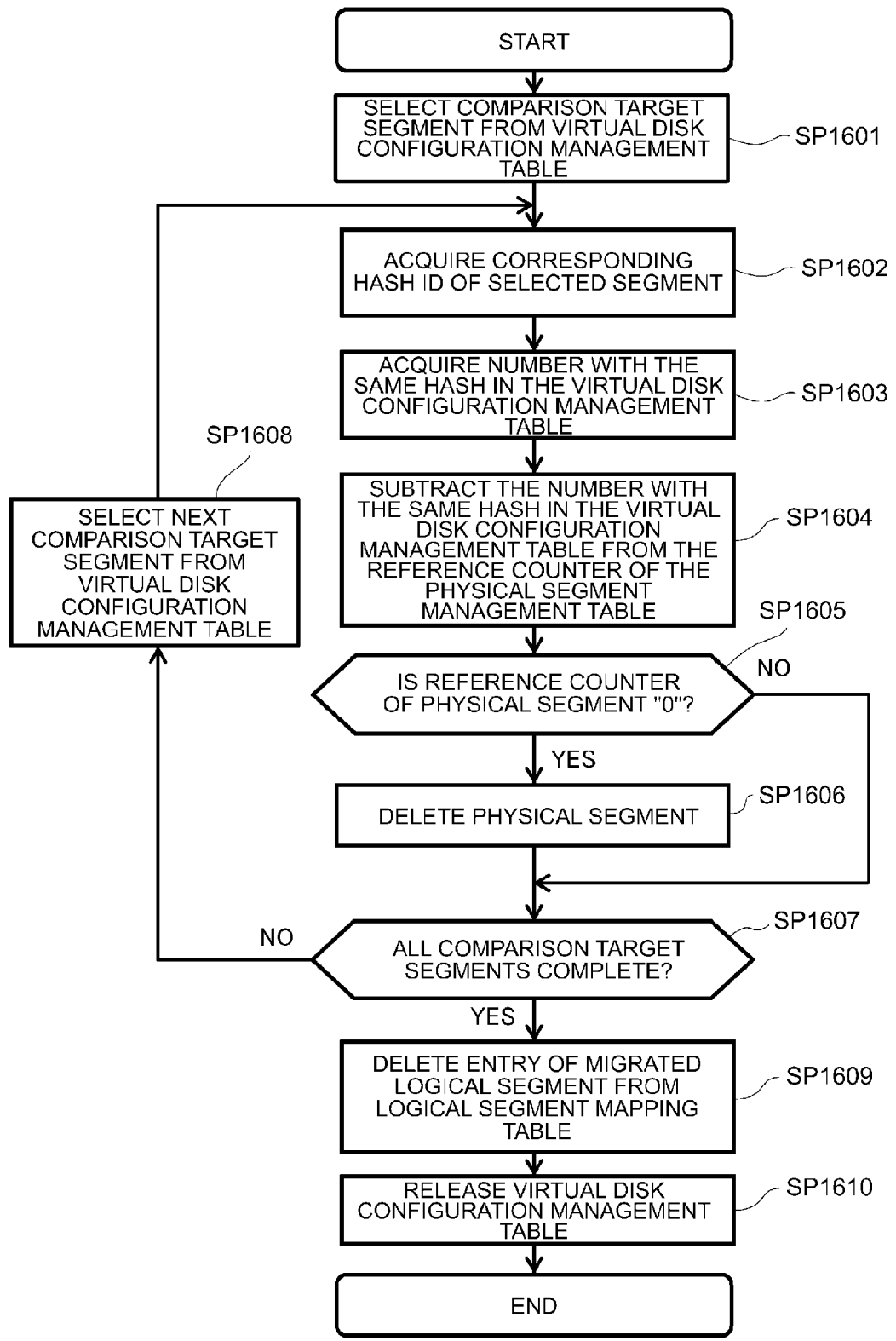
FIG. 16 is a flowchart showing migration source data deletion processing.

FIG. 16 shows a processing routine for migration source data deletion processing. The migration source data deletion processing is executed by means of co-operation between the CPU 160 of the control unit 150, and the capacity virtualization program 210, the duplicate removal program 220, and the data I/O control program 230 which are stored in the memory 200. Further, the migration source data deletion processing is executed in the migration source data deletion processing of FIG. 14.

First, the control unit 150 selects an optional logical segment for which o has been set in the comparison target attribute field 930 on the basis of the virtual disk configuration management table 900 (SP1601).

The control unit 150 then acquires a hash ID which corresponds to the logical segment selected in step SP1601 on the basis of the data hash values which are stored in the logical segment selected in step SP1601 and the hash table 600 (SP1602).

The control unit 150 then acquires, in the virtual disk configuration management table 900, the number of segments with the same hash value as the hash value of the data stored in the logical segment selected in step SP1601 (SP1603).

For example, the control unit 150 acquires 3 since the number of logical segments with a hash value of A of the data of the logical segment ID is three in the virtual disk configuration management table 900.

The control unit 150 then subtracts the number with the same hash value acquired in step SP1603 from the numerical value in the reference counter field 530 of the physical segment management table 500 (SP1604).

The control unit 150 then determines whether the value of the reference counter field 530 is 0 (SP1605).

Note that, if the reference counter is 0, this means that, because there is no logical segment 330 referencing the physical segment 370, this data does not exist from the perspective of the host 180.

Upon obtaining a negative result in the determination of step SP1605, the control unit 150 moves to step SP1607. If, on the other hand, an affirmative result is obtained in this determination, the control unit 150 deletes the physical segment 370 for which the value in the reference counter field 530 is zero (SP1606).

The control unit 150 then determines whether the processing is complete for all the comparison target segments in the virtual disk configuration management table 900 (SP1607).

Upon obtaining a negative result in this determination, the control unit 150 selects the next comparison target segment which is not yet a processing target as the processing target on the basis of the virtual disk configuration management table 900, and moves to step SP1602 (SP1608).

If, on the other hand, an affirmative result is obtained in the determination of step SP1606, the control unit 150 deletes the entry in the logical segment ID field 410 resulting from the migration of the migrated virtual disk 320 from the logical segment mapping table 400 (SP1609).

The control unit 150 then releases the virtual disk configuration management table 900 and ends the processing (SP1610).

(1-5) Effect of First Embodiment

As described earlier, with the storage system 1 and data migration method according to the first embodiment, when data stored in the virtual disk 320 which is associated with a single pool area 350 of the storage apparatus 100 is migrated to the virtual disk 320 associated with another pool area 350, migration target data is selected in a duplicate-removed state and duplicate data can be excluded from the migration targets by performing, in advance, a duplicate determination against data already present in the migration destination pool area 350, and data transfer amounts during migration of the virtual disk 320 can be deleted.

Further, in order to migrate data in a duplicate-removed state in this way, data restoration to the conventionally required non-duplicate removal state and repeated duplicate removal processing can be omitted. Accordingly, the time for migrating the virtual disk 320 can be shortened and the processing load can be alleviated.

(2) Second Embodiment

A storage system 1A according to a second embodiment differs from the storage system 1 according to the first embodiment in that an appliance unit is installed between the host 180 and the storage apparatus 100 and in that duplicate removal-related processing is executed by the appliance unit. Configurations which are the same as those of the first embodiment have been assigned the same reference signs and a description thereof is omitted, and a description of different configurations will be provided.

(2-1) Storage System Configuration

Figure 17:
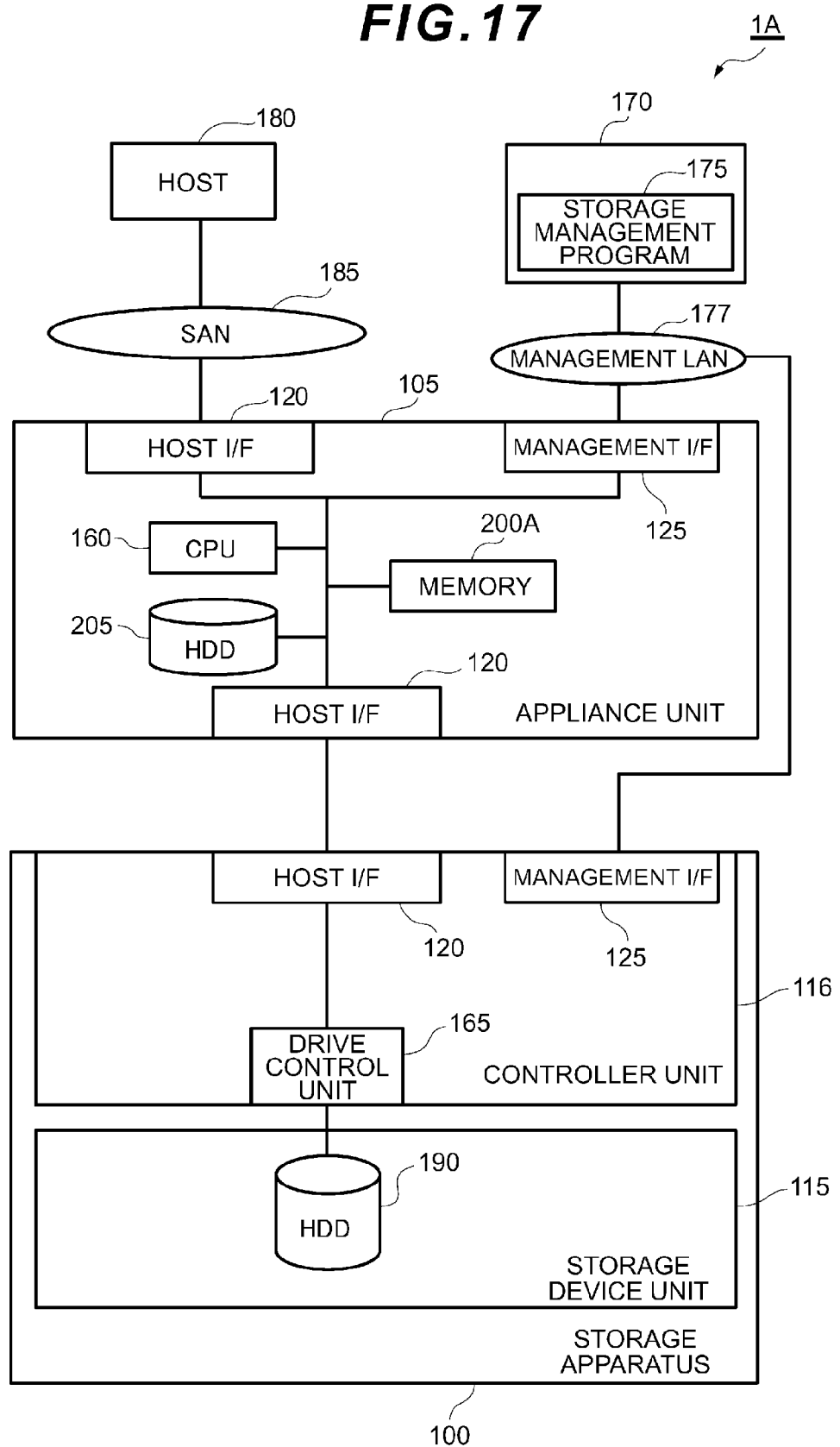
FIG. 17 is a conceptual diagram showing the overall configuration of a second storage system.

FIG. 17 shows the overall configuration of the storage system 1A according to the second embodiment. The storage system 1A is configured from a host 180, a storage apparatus 100, an appliance unit, and a management terminal 170. Further, in the storage system 1A, an appliance unit is installed between the host 180 and the storage apparatus 100, and the host 180 and the appliance unit are connected via a SAN 185. Furthermore, in the storage system 1, the storage apparatus 100, the appliance unit and the management terminal 170 are connected via a management LAN 177.

The appliance unit is configured comprising a host I/F 120, a management I/F 125, a CPU 160, a memory 200A, and an HDD 205. Note that, the configurations of the host 180, the storage apparatus 100, and the management terminal 170 are the same as in the first embodiment.

The host I/F 120 is an interface for connecting the host 180 and the appliance unit via the SAN 185 and is an interface for connecting the appliance unit and the storage apparatus 100.

The management I/F 125 is an interface for connecting the management terminal 170 and the appliance unit via the management LAN 177.

The CPU 160 centrally controls the operation of the appliance unit by means of co-operation between various programs which are stored in the memory 200A. For example, the CPU 160 executes migration processing of the virtual disk 320 while managing the pool areas 350 and virtual volumes 340 on the basis of the capacity virtualization program 210 and the duplicate removal program 220 which are stored in the memory 200A. Note that, the CPU 160 differs from the first embodiment in performing migration processing of the virtual disk 320 by way of data communications with the appliance unit and the storage apparatus 100 via the host I/F 120.

The memory 200A temporarily stores data from the host 180 or the management terminal 170. Further, the HDD 205 stores data from the host 180 or the management terminal 170 temporarily or for long periods.

Figure 18:
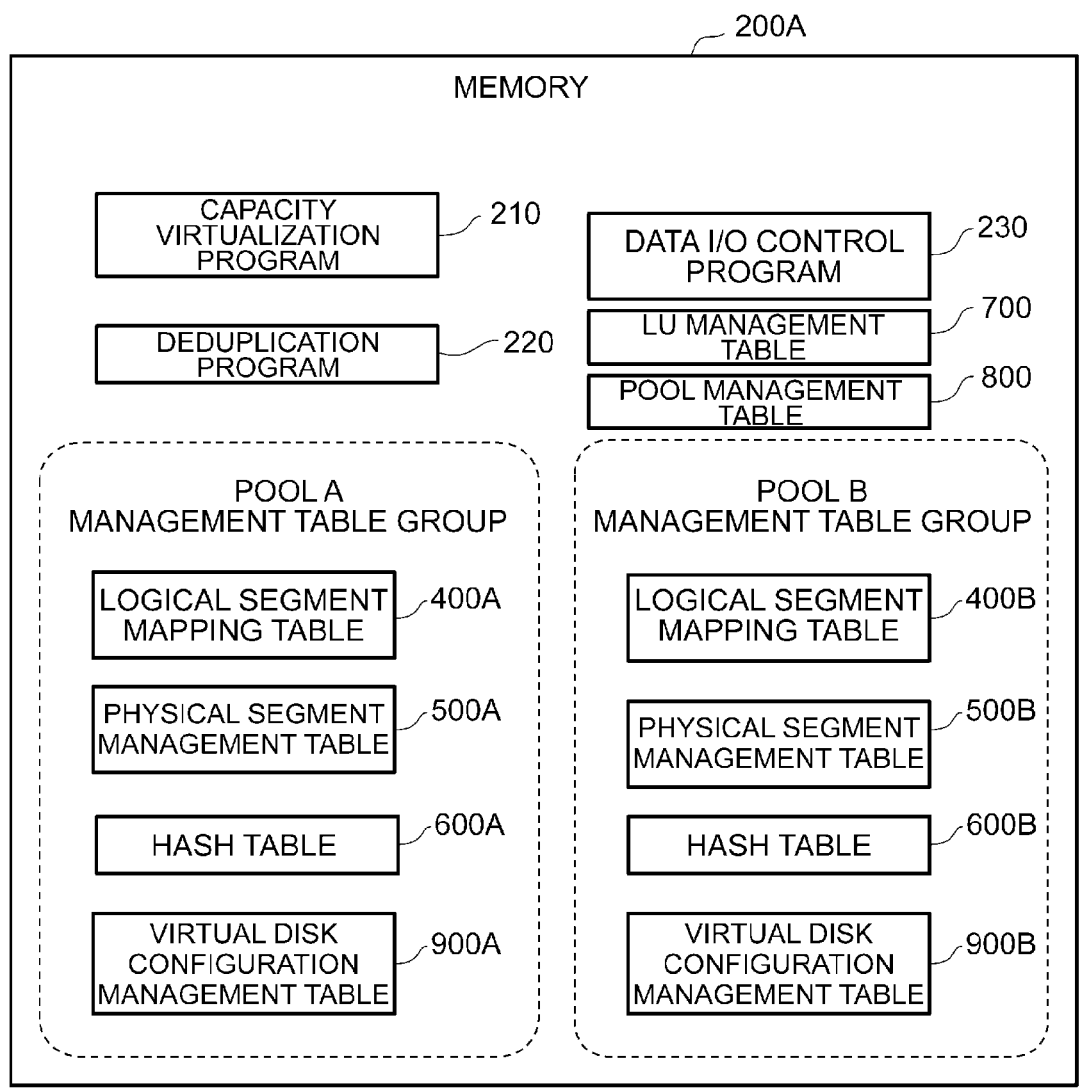
FIG. 18 is a conceptual diagram showing a functional configuration of a memory.

FIG. 18 shows a functional configuration of the memory 200A. The memory 200A differs from the memory 200 according to the first embodiment in that various programs and various tables are stored in the memory 200A of the appliance unit. Since the configuration of the memory 200A is like that of the memory 200 according to the first embodiment, a description of the memory 200A is omitted here.

(2-2) Effect of the Second Embodiment

As mentioned above, with the storage system 1A and the data migration method according to the second embodiment, the processing load on the storage apparatus 100 due to the migration processing of the virtual disk 320 can be alleviated by charging the appliance unit, which is separate from the storage apparatus 100, with the task of processing relating to migration of the virtual disk 320.

(3) Third Embodiment

A storage system 1B (not illustrated) according to a third embodiment differs from the storage system 1 according to the first embodiment in that real data is compared during the duplicate determination in order to increase data reliability. Hereinbelow, configurations like those of the first embodiment are assigned the same reference signs and a description thereof is omitted, and different configurations are described.

Note that, if a hash collision, in which hash values of different data coincide, is generated during duplicate determination, a data area may be released in order to handle the different data as identical data. In this case, there is a risk of data loss. The probability of a hash collision occurring is said to be very low, although the probability is not zero. In the third embodiment, a comparison of real data is performed in order to avoid the risk of data loss.

A determination of whether to perform a real data comparison may be set via the management terminal 170 for pool areas 350 with a valid duplicate removal setting. The targets need not be limited to the pool areas 350, rather, the target may be the storage apparatus 100 or other units. Further, this determination is not limited to a setting screen, rather, this determination may be incorporated into a command instruction or program.

(3-1) Memory Configuration

Figure 19:
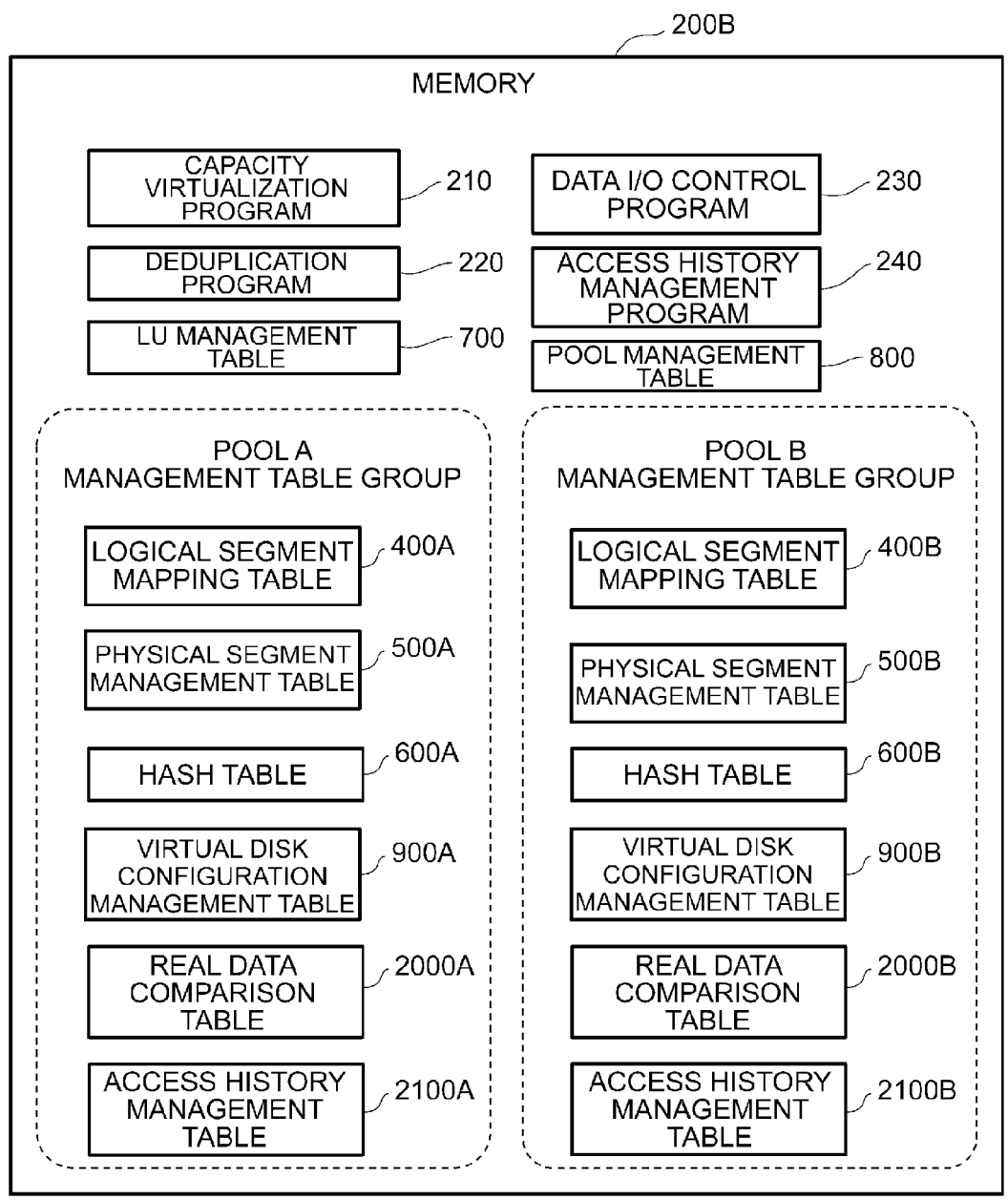
FIG. 19 is a conceptual diagram showing a functional configuration of a third memory.

FIG. 19 shows a functional configuration of the memory 200B according to the third embodiment. This memory 200B differs from the memory 200 according to the first embodiment in that the memory 200B is configured comprising an access history management program 240, real data comparison tables 2000A, 2000B, and access history management tables 2100A, 2100B.

(3-2) Configuration of Various Tables

FIG. 20 shows a conceptual diagram of the real data comparison table 2000A. The real data comparison table 2000A is a table for managing the correspondence relationships of segments with matching hash values between the logical segments comprising the migration target virtual disk 320 and physical segments of the migration destination pool area 350.

The real data comparison table 2000A is configured from a migration source logical segment ID field 2010A, a migration destination logical segment ID field 2020A, and a LUN field 2030A.

The migration source logical segment ID field 2010A stores, among the migration target logical segments stored in the virtual disk configuration management table 900, the ID of the logical segment for which the hash value matches any of the hash values stored in the hash table 600 of the migration destination pool area 350.

The migration destination physical segment ID field 2020A stores the ID of physical segment of the migration destination pool area 350 which has the same hash value as the data hash value stored in the migration source logical segment.

The LUN field 2030A stores the identifier of the virtual volume 340 to which the migration source logical segment belongs.

Note that the real data comparison table 2000B is the same as the real table comparison table 2000A and hence an illustration and description thereof are omitted here. Further, in the following description, if there is no distinction made between the real data comparison table 2000A and the real data comparison table 2000B, the two tables are referred to collectively as the real data comparison tables 2000.

FIG. 21 shows a conceptual diagram of the access history management table 2100A. The access history management table 2100A is a management table for managing access with a given frequency in the units of the physical segments 370 stored in the storage apparatus 100 and managing which physical segment 370 is accessed last.

The access history management table 2100A is configured from a physical segment ID field 2110A, an access frequency field 2120A, and a last access time field 2130A.

The physical segment ID field 2110A stores identifiers for uniquely identifying the physical segments 370 which are stored in the pool area 350 of the storage apparatus 100.

The access frequency field 2120A stores values indicating how many times access occurs in a fixed period which is determined for the physical segments 370.

The last access time field 2130A stores year/month/day/time information when the physical segment 370 was last accessed.

Further, the access history management table 2100B is the same as the access history management table 2100A and hence illustrations and a description thereof are omitted. Further, in the following description, if there is no distinction made between the access history management table 2100A and the access history management table 2100B, the two tables are referred to collectively as the access history management tables 2100.

(3-3) Various Processing

Figure 22:
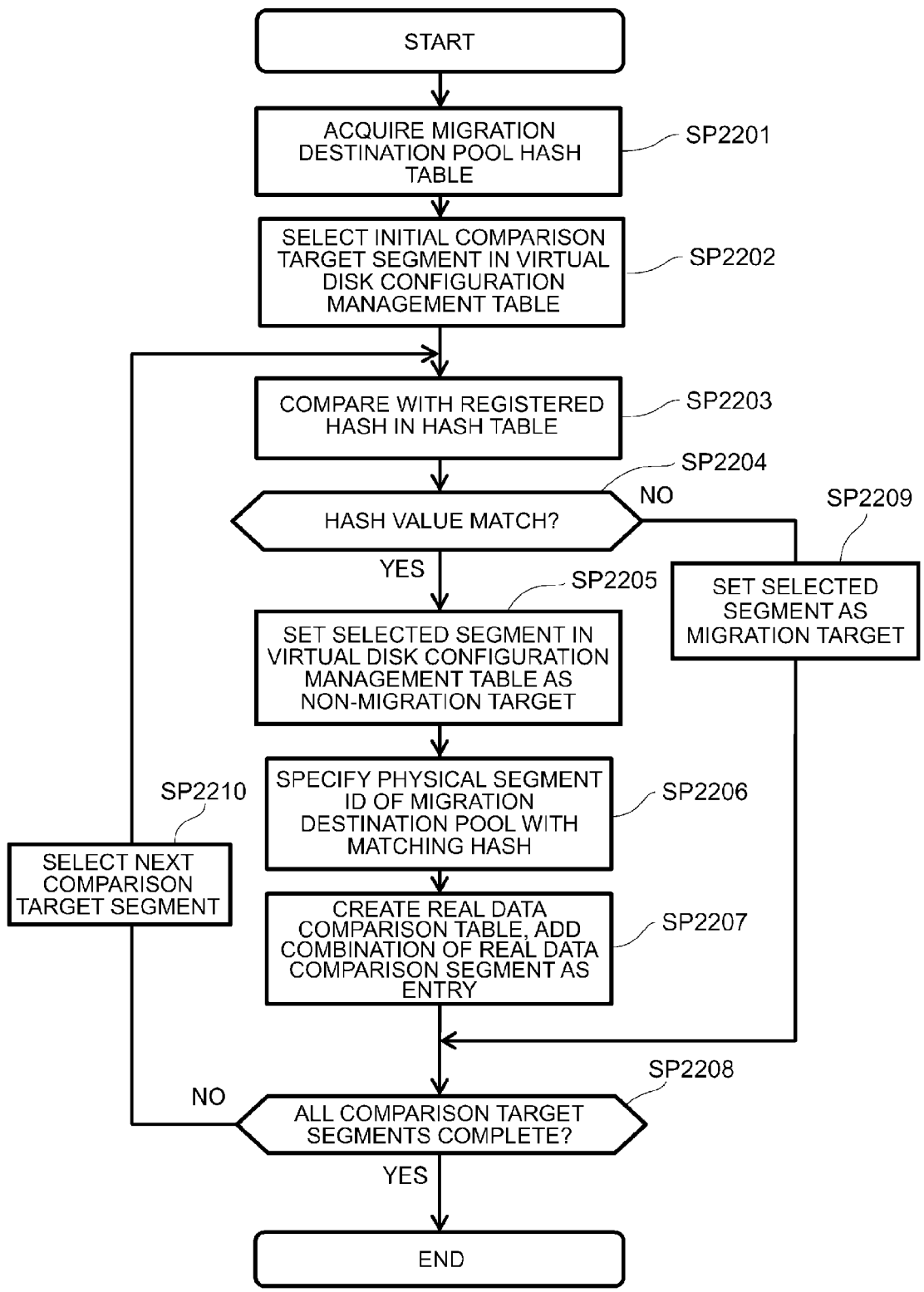
FIG. 22 is a flowchart showing pool duplicate determination processing.

FIG. 22 shows a processing routine for pool duplicate determination processing. The pool duplicate determination processing is executed by means of co-operation between the CPU 160 of the control unit 150, and the capacity virtualization program 210, the duplicate removal program 220, and the data I/O control program 230 which are stored in the memory 200B. Further, the pool duplicate determination processing is executed after the virtual disk duplicate determination processing illustrated in FIG. 12. Hereinbelow, for the sake of convenience in the description, the control unit 150 is described as the processing subject.

The processing of steps SP2201 to SP2205 is the same as the processing of steps SP1301 to SP1305 of FIG. 13 and hence a description thereof is omitted here.

The control unit 150 specifies the physical segment ID of the migration destination pool area 350 for which it is determined that the hash value matches the comparison target logical segment of the virtual disk configuration management table 900 selected as the processing target in step SP2204 (SP2206).

More specifically, the control unit 150 specifies the corresponding hash ID from the hash table 600 on the basis of the matching hash value and specifies the physical segment ID with the hash ID specified from the physical segment management table 500.

Thereafter, the control unit 150 creates a real data comparison table 2000 is no such table has been created and, if this table has already been created, the control unit 150 adds a combination of the logical segment selected from the virtual disk configuration management table 900 for which a hash value match was determined in step SP2204 and the physical segment ID specified in step SP2206, as well as the LUN of the virtual volume 340 to which the selected logical segment belongs, as an entry in the real data comparison table 2000 (SP2207).

Thereafter, the control unit 150 determines whether the processing is complete for all the comparison target segments (SP2208).

Upon obtaining a negative result in this determination, the control unit 150 moves to step S2210 and selects the next unprocessed comparison target segment before moving on to step SP2203 (SP2210).

If, on the other hand, an affirmative result is obtained in the determination of step SP2208, the control unit 150 ends the pool duplicate determination processing.

Figure 23A:
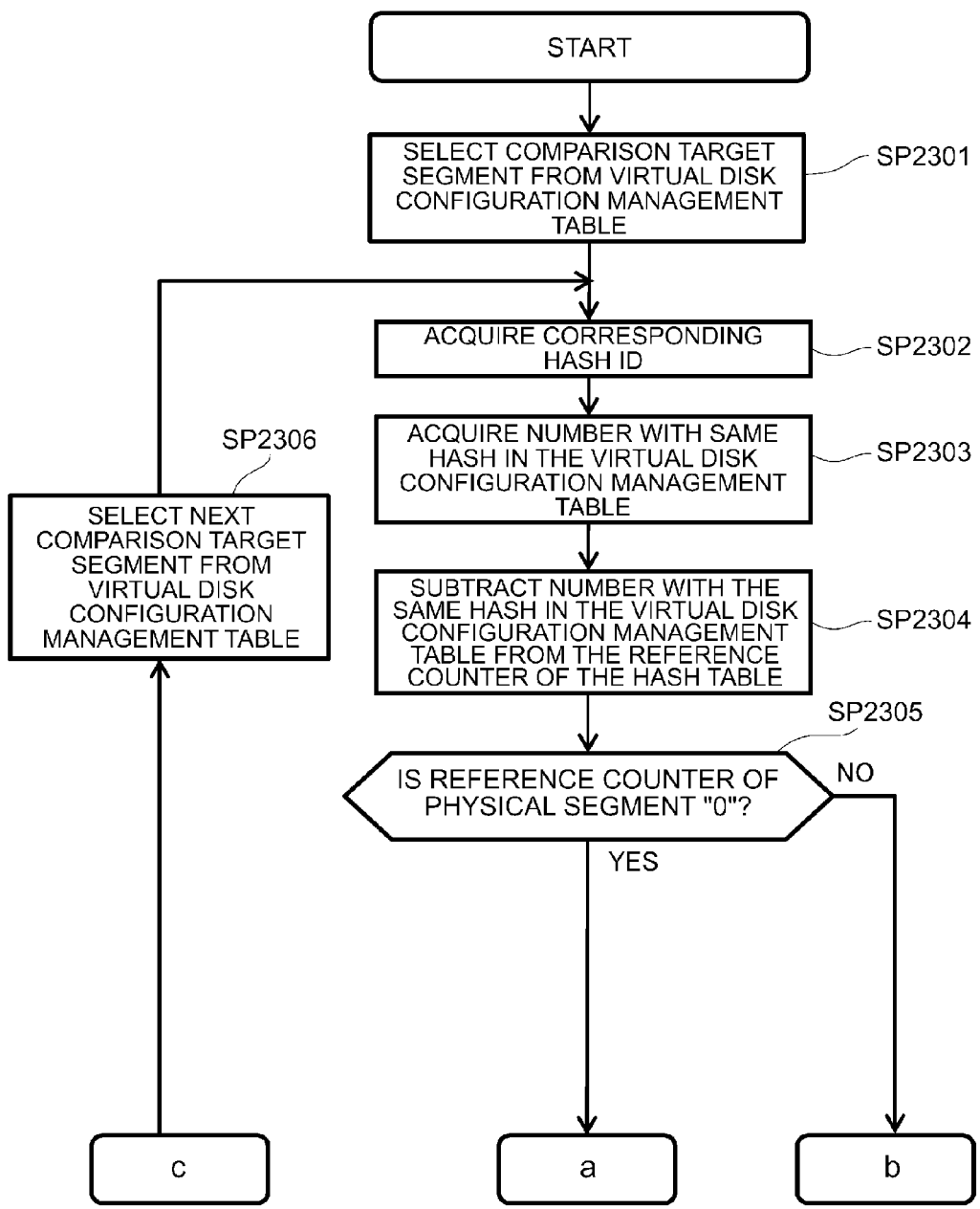
FIG. 23A is a flowchart showing migration source data deletion processing.
Figure 23B:
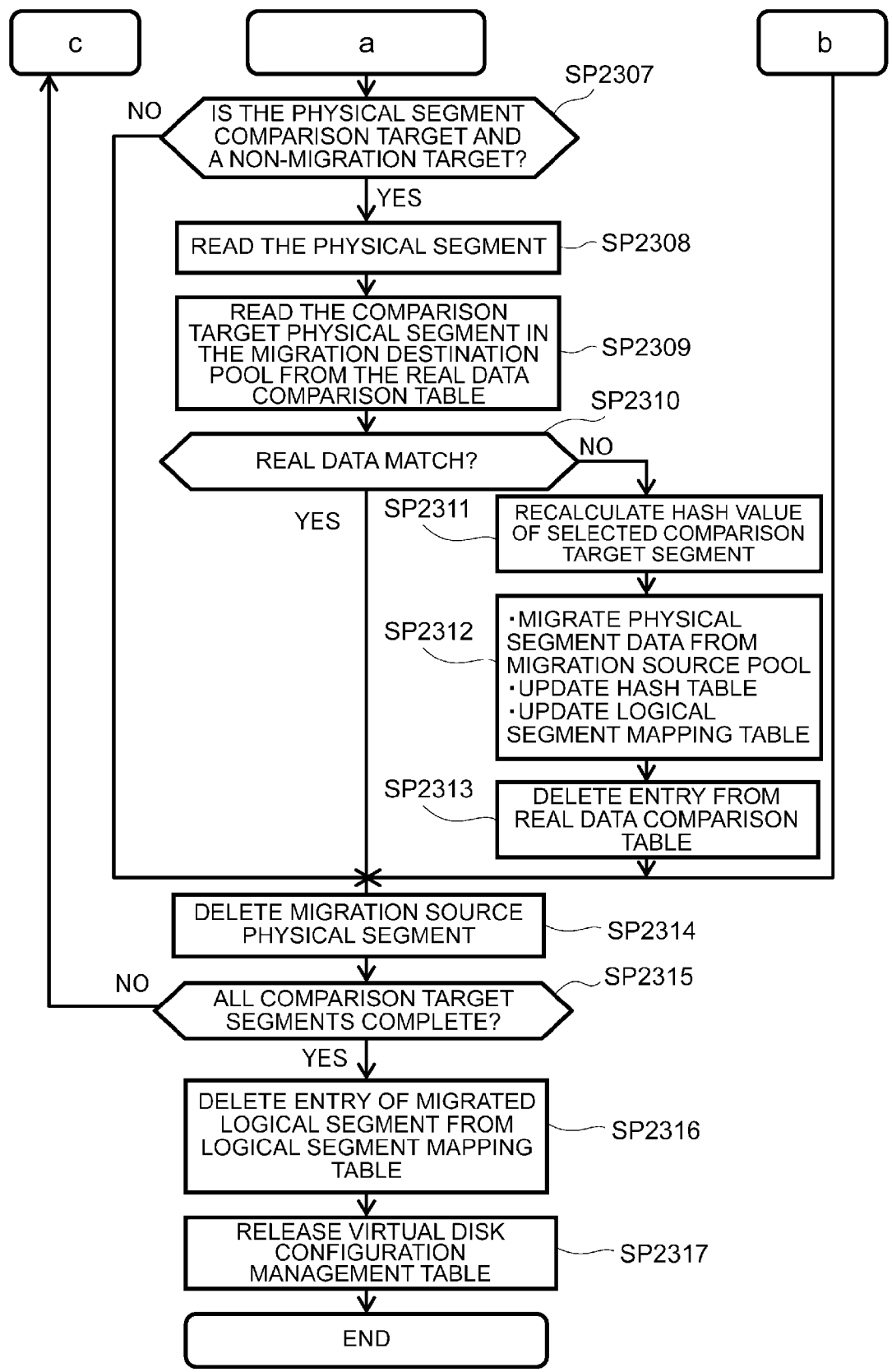
FIG. 23B is a flowchart showing migration source data deletion processing.

FIGS. 23A and 23B show processing routines for migration source data deletion processing. This migration source data deletion processing is executed by means of co-operation between the CPU 160 of the control unit 150 and the capacity virtualization program 210, the duplicate removal program 220, and the data I/O control program 230 which are stored in the memory 200B. Further, the migration source data deletion processing is executed in the migration source data deletion processing of FIG. 14.

The processing of steps SP2301 to SP2306 is the same as steps SP1601 to SP1605 and SP1608 in FIG. 16, and hence a description thereof is omitted.

The control unit 150 determines whether a physical segment 370 for which it is determined that the reference counter is 0 in step SP2305 is a non-migration target physical segment 370 (SP2307).

Note that the reference counter is 0 and a non-migration target physical segment 370 is a physical segment 370 which is referenced by the logical segment ID for which o has been set as the comparison target attribute in the virtual disk configuration management table 900 selected in step SP2301 and is a physical segment 370 which stores data for which there is no need to migrate real data because duplicate data exists in the migration destination pool area 350.

Upon receiving a negative result in the determination of step SP2307, the control unit 150 moves to step SP2314. If, on the other hand, an affirmative result is obtained in the determination of step SP2307, the control unit 150 reads the physical segment 370, which is referenced by the logical segment 330 comprising the virtual disk 320 which is the migration target, from the migration source pool area 350 (SP2308).

The control unit 150 then reads the physical segment 370 which corresponds to the comparison target segment from the migration destination pool area 350 on the basis of the real data comparison table 2000 (SP2309).

The control unit 150 then compares the data stored in the physical segment 370 which has been read from the migration source pool area 350 in step SP2308 with the data stored in the physical segment 370 read from the migration destination pool area 350 in step SP2309 (SP2310).

Upon obtaining a negative result in this determination, the control unit 150 acquires a different hash value by recalculating the hash value of the selected comparison target segment (SP2311).

The control unit 150 then copies the data of the physical segment 370 from the migration source pool area 350 to the migration destination pool area 350, updates the hash table 600, and updates the logical segment mapping table 400 (SP2312).

Note that, although an identical hash value is obtained in the hash value comparison processing during migration of the virtual disk 320 in step SP2312, because real data is different data, the control unit 150 must newly copy the data of the physical segment 370 because data of the migration source physical segment 370 with a matching hash value is not present in the migration destination pool area 350.

Further, the control unit 150 registers a hash value, which is different from the hash value for which the recalculated comparison result yielded a match in step SP2311, in the hash table 600 of the migration destination pool area 350, registers a hash ID of the newly copied physical segment 370 in the hash ID field 610, and updates the physical segment management table 500.

Furthermore, in the series of virtual disk 320 migration processes, because mapping information mapping the logical segments 330 registered in the logical segment mapping table 400 converted in the virtual disk configuration information conversion processing shown in FIG. 15 to the physical segments 370 changes, the control unit 150 converts the comparison target segments and changes the physical segment IDs which correspond to the logical segment IDs registered in the logical segment mapping table 400 of the migration destination pool area 350 to the newly copied physical segment IDs.

The control unit 150 then deletes the entry of the physical segment 370 obtained by completing a new copy in the real data comparison table 2000 (SP2313).

The control unit 150 then deletes the migration source physical segment 370 (SP2314).

The control unit 150 then determines whether processing is complete for all the comparison target segments registered in the virtual disk configuration management table 900 (SP2315).

Upon obtaining a negative result in this determination, the control unit 150 moves to step SP2306. If, on the other hand, an affirmative result is obtained in this determination, the control unit 150 deletes the entry for the logical segment 330 comprising the migrated virtual disk 320 from the logical segment mapping table 400 of the migration source pool area 350 (SP2316).

The control unit 150 then releases the migration target virtual disk configuration management table 900 (SP2317), and ends the migration source data deletion processing.

Figure 24:
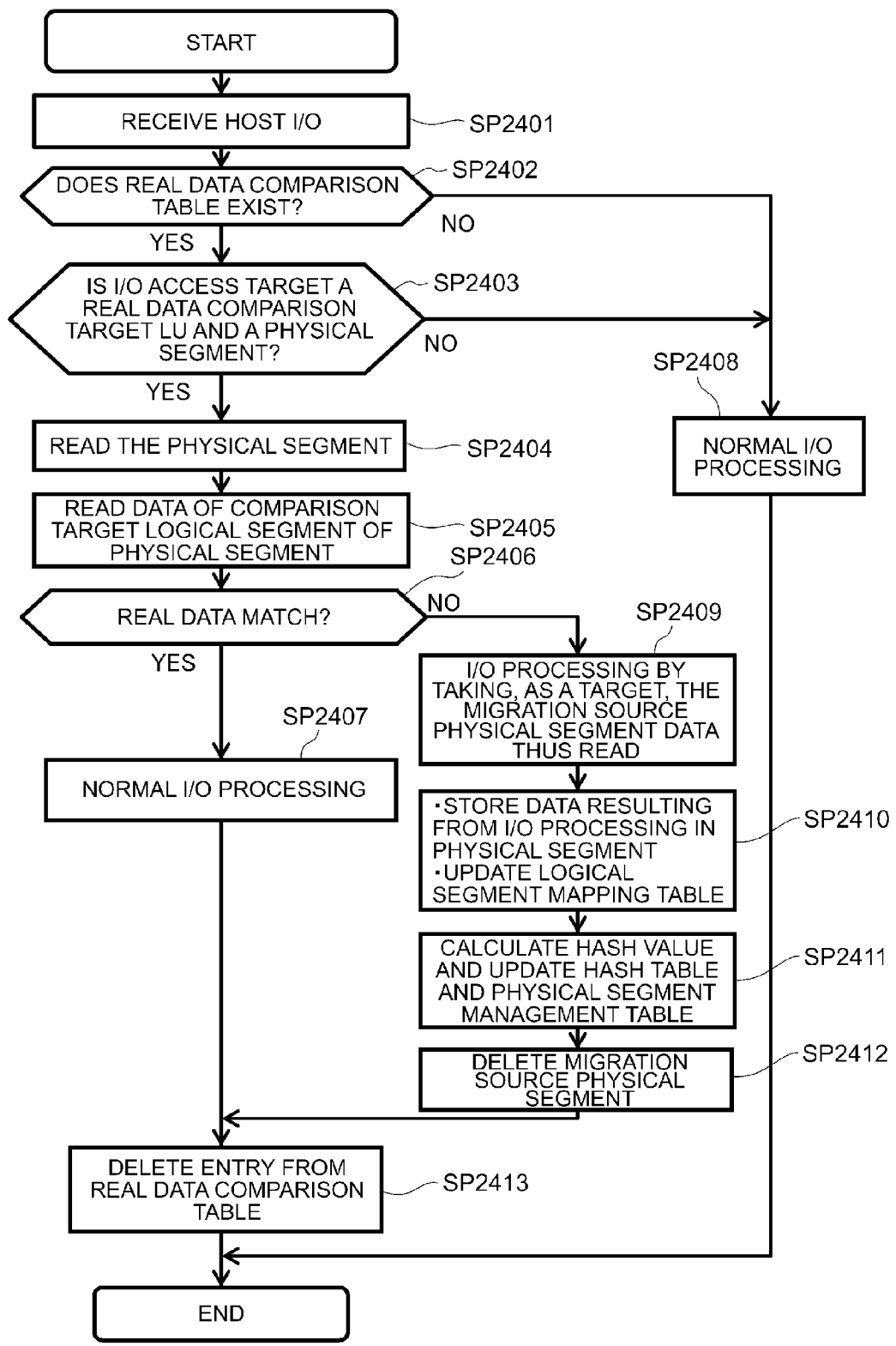
FIG. 24 is a flowchart showing comparison processing when a host I/0 is received.

FIG. 24 shows a processing routine for comparison processing when a host I/O is received. The comparison processing when the host I/O is received is executed by means of co-operation between the CPU 160 of the control unit 150 and the capacity virtualization program 210, the duplicate removal program 220, and the data I/O control program 230 which are stored in the memory 200B. Further, the comparison processing when a host I/O is received is executed when I/O processing by the host 180 is received after completion of the virtual disk migration processing and before execution of the migration source data deletion processing illustrated in FIGS. 23A and 23B.

First, the control unit 150 receives an I/O from the host 180 (SP2401).

The control unit 150 then determines whether a real data comparison table 2000, which is created if a segment is present for which there is a matching hash value between pool areas 350 when the virtual disk 320 is migrated, exists (SP2402).

Upon obtaining a negative result in this determination, the control unit 150 executes normal I/O processing (SP2408) and completes the comparison processing when the host I/O is received.

If, on the other hand, an affirmative result is obtained in the determination of step SP2402, the control unit 150 determines whether the I/O access target received from the host 180 in step SP2401 corresponds to the migration destination physical segment ID of the virtual volume 340 which is the real data comparison target registered in the real data comparison table 2000 (SP2403).

Upon obtaining a negative result in this determination, the control unit 150 moves to step SP2408. If, on the other hand, an affirmative result is obtained in this determination, the control unit 150 reads data which is stored in the real data comparison target physical segment which is the access target for access by the host 180 (SP2404).

The control unit reads the data of the physical segment read in step SP2404 and of the migration source logical segment which is the real data comparison target (SP2405).

Note that the control unit 150 specifies and reads the physical segment 370, which the migration source logical segment registered in the real data comparison table 2000 references in the migration source pool area 350, from the logical segment mapping table 400.

The control unit 150 compares the real data between the physical segment 370 read in step SP2404 with the physical segment 370 read in step SP2405, and determines if there is a match (SP2406).

When an affirmative result is obtained in this determination, the control unit 150 moves to step SP2413 after executing normal I/O processing (SP2407).

If, on the other hand, a negative result is obtained in the determination of step SP2406, the control unit 150 executes I/O processing by taking, as a target, the data of the migration source physical segment 370 which was read in step SP2405 (SP2409).

The control unit 150 then stores the data obtained by executing the I/O processing in the physical segment 370 of the migration destination pool area 350, and updates the logical segment mapping table 400 (SP2410).

More specifically, [the logical segment mapping table 400] is changed so as to reference the physical segment 370 in which the data obtained by executing the I/O processing is stored in step SP2410.

The control unit 150 then calculates a hash value for the data of the physical segment 370 as a result of the I/O processing in step SP2410, and updates the hash table 600 and the physical segment management table 500 (SP2411).

The control unit 150 then deletes the migration source physical segment 370 read in step SP2405 (SP2412).

The control unit 150 then deletes an entry obtained by comparing real data from the real data comparison table 2000 (SP2413) and ends the comparison processing when the host I/O is received.

Figure 25:
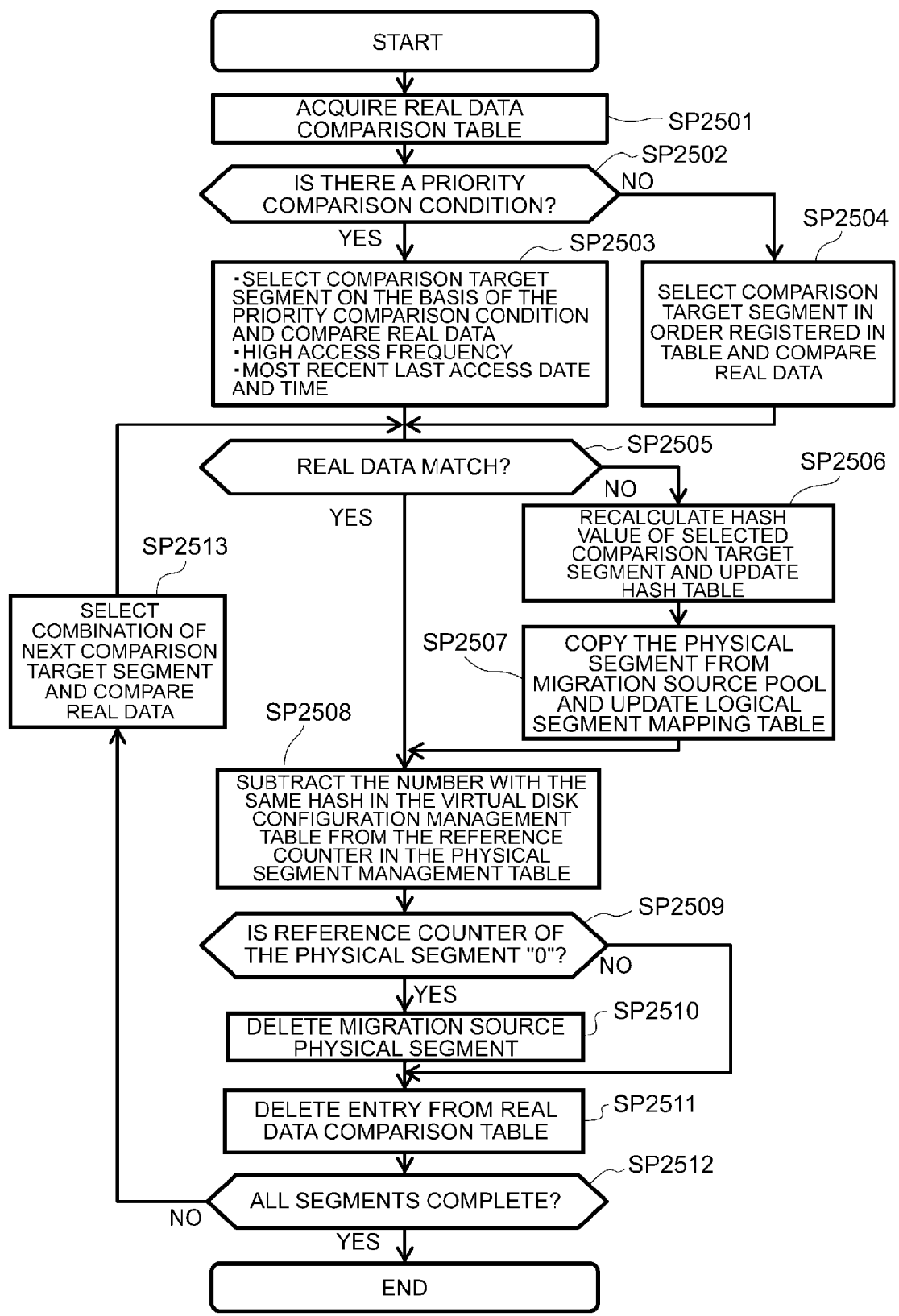
FIG. 25 is a flowchart showing real data comparison processing.

FIG. 25 shows a processing routine for real data comparison processing. The real data comparison processing is executed by means of co-operation between the CPU 160 of the control unit 150 and the capacity virtualization program 210, the duplicate removal program 220, and the data I/O control program 230 which are stored in the memory 200B. Further, the real data comparison processing is executed on the occasion of a real data comparison event after the virtual disk migration processing is complete.

A real data comparison event may be when migration of the virtual disk 320 is complete, after a fixed time has elapsed after migration of the virtual disk 320 is complete, or in a time zone when the load on the storage apparatus 100 is low. The real data comparison event may also be executed either before or after the migration source data deletion processing illustrated in FIGS. 23A and 23B.

First, the control unit 150 acquires the real data comparison table 2000 (SP2501).

The control unit 150 then determines whether a priority comparison condition has been set (SP2502).

The priority comparison condition is a condition for selecting a target for which a real data comparison is prioritized among the segments registered in the real data comparison table 2000, and is basically a condition for extracting data stored in a segment which is likely to be used.

Upon obtaining an affirmative result in the determination of step SP2502, the control unit 150 compares real data by selecting the processing target segment from the real data comparison table 2000 on the basis of the priority comparison condition. For example, the priority comparison condition is a high access frequency for the physical segment 370 or the most recent last access date and time of access to the physical segment 370 (SP2503).

Note that, by completing the real data comparison before access to the physical segment 370 by the host 180 takes place, it is possible to eliminate the processing load when access occurs and prevent any delay.

With regard to the access frequency and last access date and time of the physical segment 370 which is the real data comparison target, it is possible to acquire the access frequency or last access date and time recorded in the access history management table 2100. In a case where the access frequency is set as the priority condition, processing targets for the real data comparison are set in order starting with the largest numerical value for the access frequency, and if the most recent last access date and time is set as the priority condition, the execution targets for the real data comparison processing can be set in order starting with the segment with the most recent date and time as the last access time 2130.

Returning to step SP2502, upon obtaining a negative result in the determination of step SP2502, because a priority comparison condition has not been set, the control unit 150 compares real data by selecting comparison target segments in an optional order registered in the real data comparison table 2000 (SP2504).

The real data comparison reads the data of the physical segment 370 of the migration source pool area 350 which the selected migration source logical segment references from the entry registered in the real data comparison table 2000, and compares the two by reading the data of the migration destination physical segment stored in the migration destination pool area 350.

The control unit 150 determines whether there is a match in the real data compared in steps SP2503 and SP2504 (SP2505).

Upon obtaining an affirmative result in this determination, the control unit 150 moves to step SP2508. If, on the other hand, a negative result is obtained in this determination, the control unit 150 recalculates the hash value of the physical segment 370 referenced by the migration source logical segment and updates the hash table 600 of the migration destination pool area 350 (SP2506).

The control unit 150 then copies data of the physical segment 370 for which the hash value has been recalculated from the migration source pool area 350 to the migration destination pool area 350 (SP2507).

The control unit 150 subsequently calculates the number of segments with the same hash value as the hash value of the real data comparison target logical segment in the virtual disk configuration management table 900 and subtracts this number from the reference counter field 530 of the physical segment management table 500 of the migration source pool area 350 (SP2508).

The control unit 150 then determines, for the processing target physical segment 370, whether the value of the reference counter field 530 of the physical segment management table 500 is 0 as a result of the processing of step SP2508 (SP2509).

Upon obtaining a negative result in this determination, the control unit 150 migrates to step SP2511. If, on the other hand, an affirmative result is obtained in this determination, the control unit 150 deletes the physical segment 370 for which the value of the reference counter field 530 is 0 (SP2510).

The control unit 150 then deletes the corresponding entry from the real data comparison table 2000 (SP2511).

The control unit 150 then determines whether processing is complete for all the segments which are registered in the real data comparison table 2000 (SP2512).

Upon obtaining a negative result in this determination, the control unit 150 compares the real data by selecting a combination of the next comparison target segments registered in the real data comparison table 2000 (SP2513).

If, on the other hand, an affirmative result is obtained in the determination of step SP2512, the control unit 150 ends the real data comparison processing.

(3-4) Effect of the Third Embodiment

As mentioned earlier, with the storage system 1B and the data migration method according to the third embodiment, when the data stored in the virtual disk 320 which is associated with one pool area 350 in the storage apparatus 100 is migrated to a virtual disk 320 which is associated with another pool area 350, a real data comparison can be made in a data duplicate determination between the different pool areas 350. Accordingly, in comparison with a data duplicate determination which uses only hash values, the reliability of the data can be improved. In addition, by comparing real data asynchronously after migrating the data stored in the virtual disk 320, the processing time of the virtual disk 320 can be shortened.

(4) Fourth Embodiment

A storage system 1C according to a fourth embodiment differs from the storage system 1 according to the first embodiment in that duplicate removal-related processing is executed by two or more storage apparatuses 100C and 110C. Hereinafter, configurations which are the same as those of the first embodiment are assigned the same reference signs and a description thereof is omitted, and different configurations will be described.

(4-1) Storage System Configuration

Figure 26:
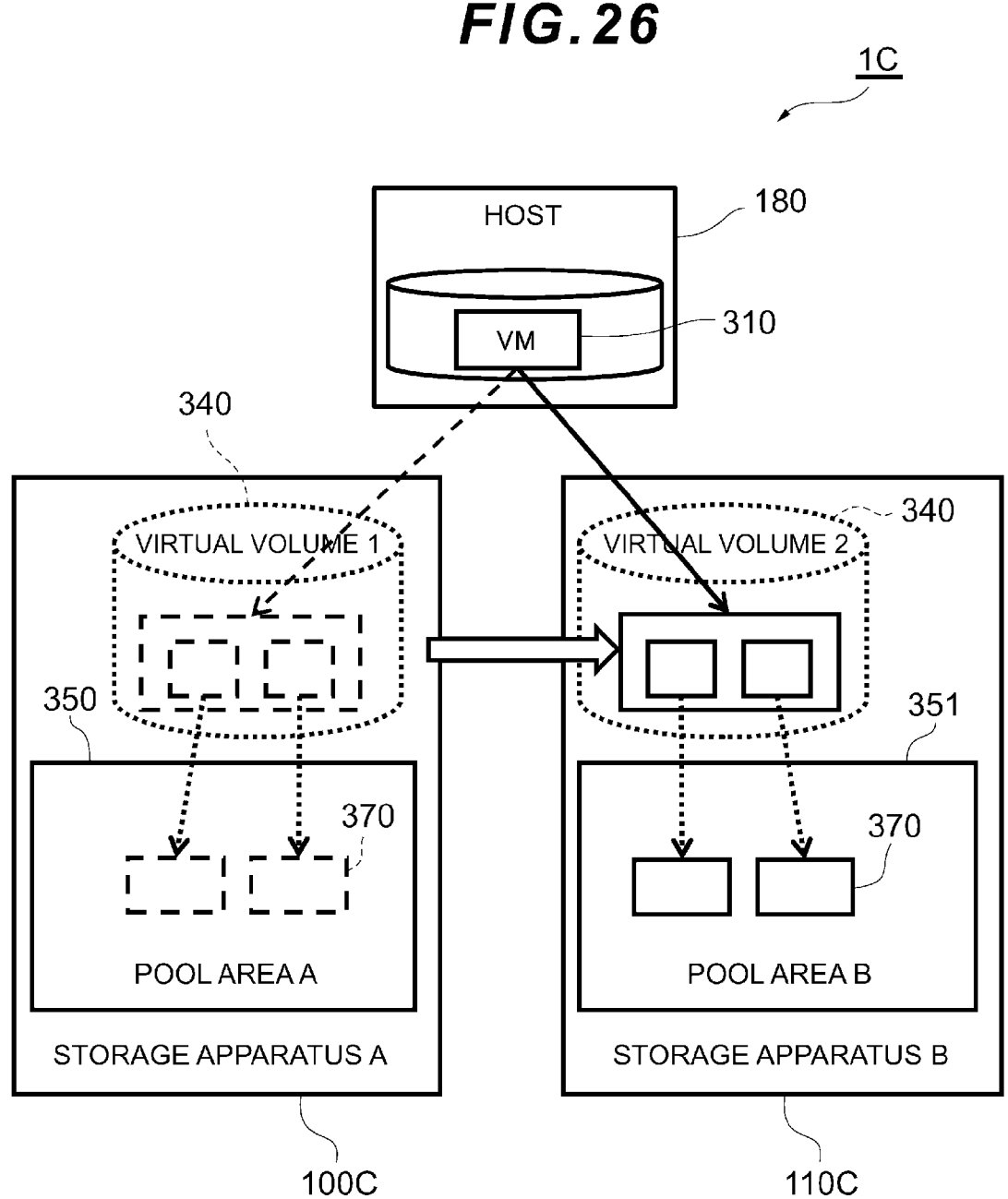
FIG. 26 is a conceptual diagram showing a logical configuration of a fourth storage system.

FIG. 26 shows a logical configuration of the storage system 1C according to the fourth embodiment. The host 180 in the storage system 1C differs from the first storage system 1 in that the host 180 is configured connected to both the storage apparatus 100C and the storage apparatus 110C via a SAN 185. The storage system 1C according to the fourth embodiment implements processing in which the virtual disk 320 stored in the virtual volume 340 of the storage apparatus 100C is migrated to the virtual disk 340 of the storage apparatus 110C on the basis of an instruction from the host 180.

Figure 27:
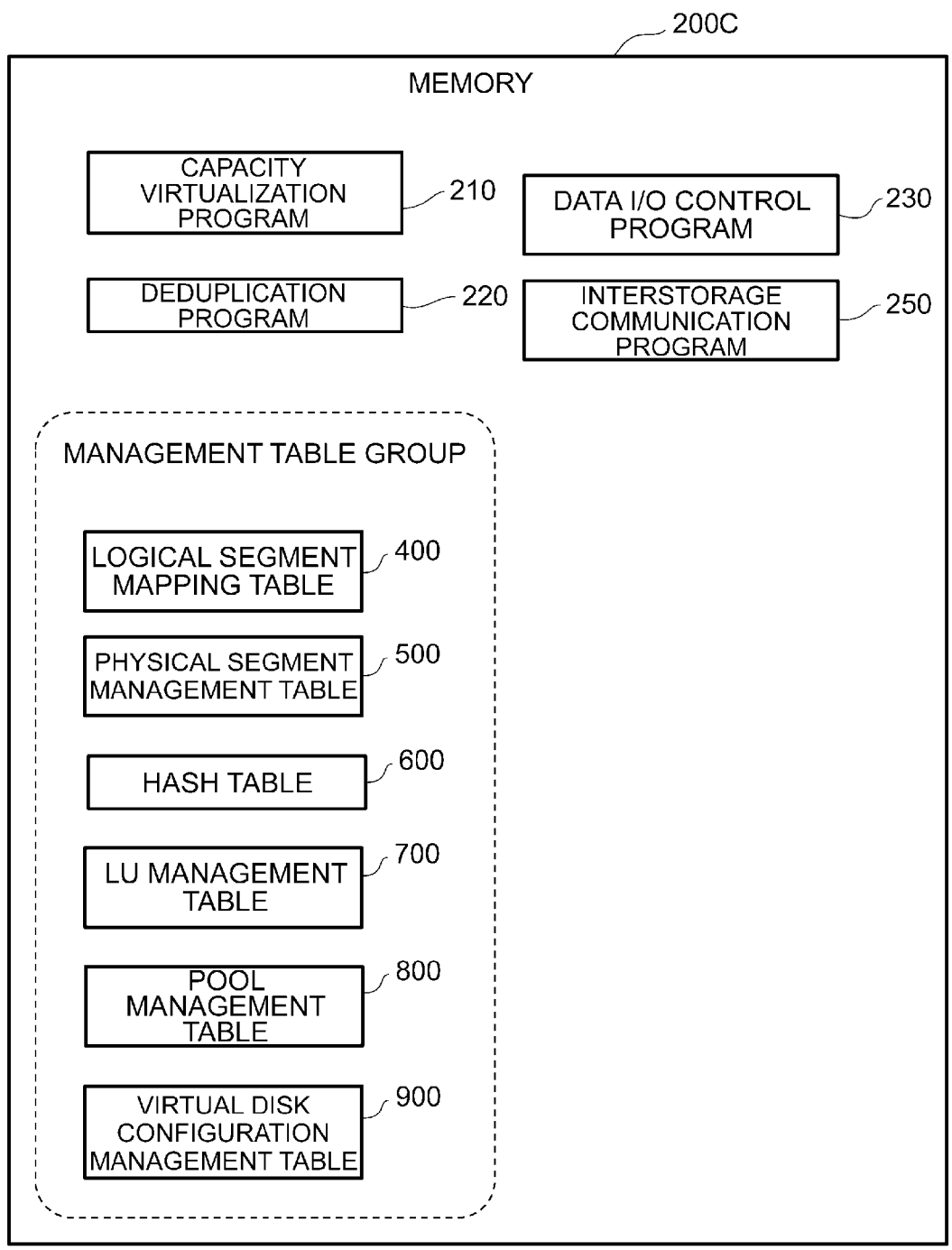
FIG. 27 is a conceptual diagram showing a functional configuration of a memory.

FIG. 27 shows a functional configuration of a memory 200C. The storage apparatus 100C and the storage apparatus 110C are each configured with the same configuration and comprising the memory 200C, and differ from the memory 200 according to the first embodiment in comprising an inter-storage communication program 250.

The inter-storage communication program 250 is a program for converting various setting management information and control information between the storage apparatus 100C and the storage apparatus 110C. Note that, there is no particular need for a separate inter-storage communication program 250 as long as there is processing to migrate management information and the like between storage apparatuses.

(4-2) Various Processing

Figure 28:
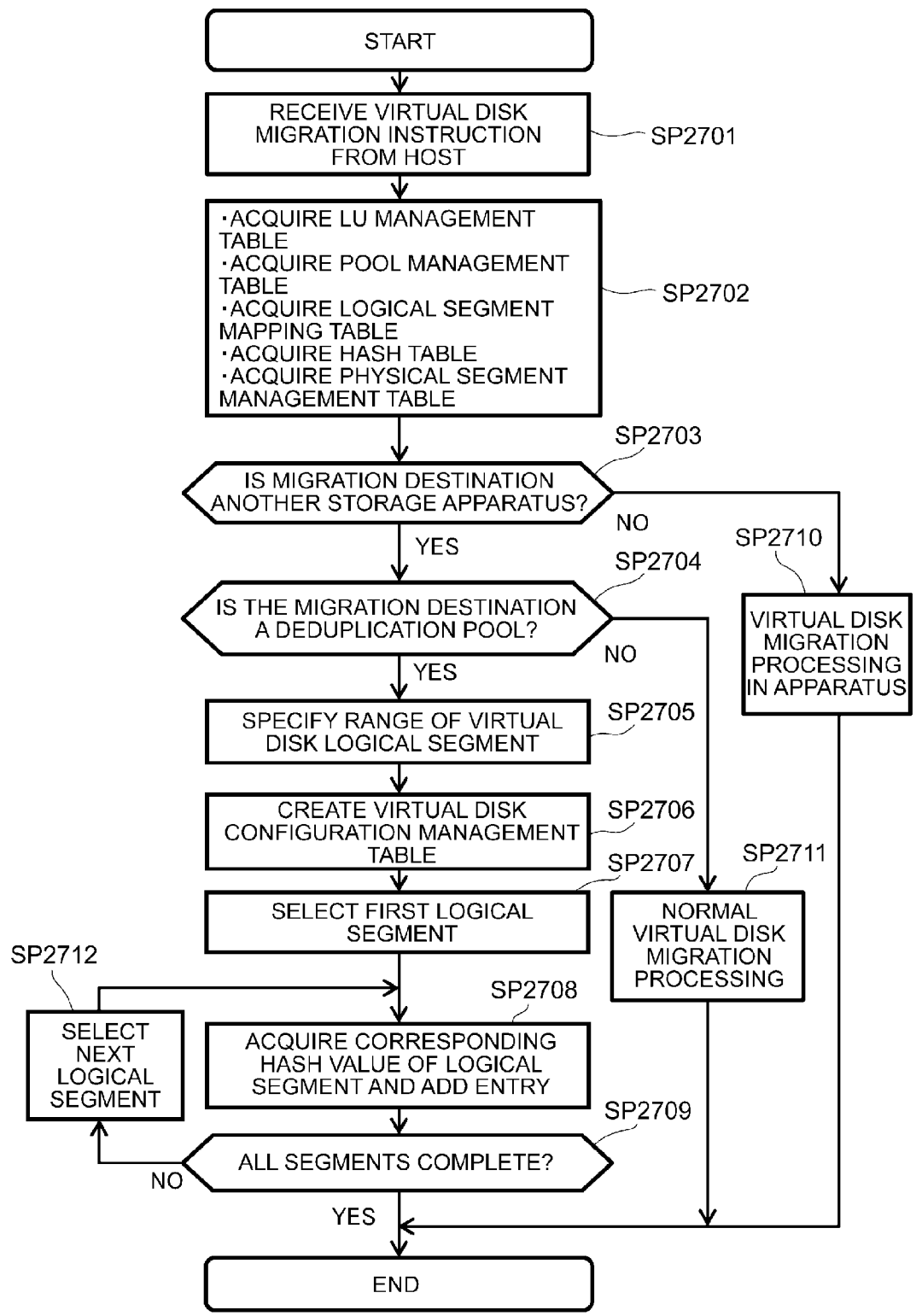
FIG. 28 is a flowchart showing virtual disk configuration information creation processing.

FIG. 28 shows a processing routine for virtual disk configuration information creation processing for creating configuration information of the virtual disk 320 which is migrated between the storage apparatus 100C and the storage apparatus 110C. The virtual disk configuration information creation processing is executed by means of co-operation between the CPU 160 of the control unit 150, the capacity virtualization program 210, the duplicate removal program 220, and the data I/O control program 230 which are stored in the memory 200C. Further, the virtual disk configuration information creation processing is executed upon receiving a virtual disk migration instruction from the host 180. Hereinafter, for the sake of convenience in the description, the control unit 150 is described as the processing subject.

Other than steps SP2703 and SP2710, this processing is the same as the virtual disk configuration information creation processing in FIG. 11, and hence a description thereof is omitted here.

The control unit 150 determines whether the migration destination of the virtual disk 320 instructed by the host 180 is another storage apparatus 110C (SP2703).

Upon obtaining a negative result in this determination, the control unit 150 executes processing to migrate the virtual disk 320 in the storage apparatus 100C (SP2710), and ends the virtual disk configuration information creation processing.

Note that, in step SP2704, it is determined whether the migration destination is a duplicate removal pool in the other storage apparatus 110C. The storage apparatus 100C, which is the migration source, exchanges configuration information and setting management information and so on with the migration destination storage apparatus 110C instructed by the host 180 via the inter-storage communication program 250. As a result, the storage apparatus 100C is able to acquire setting information indicating whether a duplicate removal setting has been made for the storage apparatus 110C and the migration destination pool area 350 in the storage apparatus 110C. Further, the storage apparatus 100C may acquire information from the host 180 and the management terminal 170.

Figure 29:
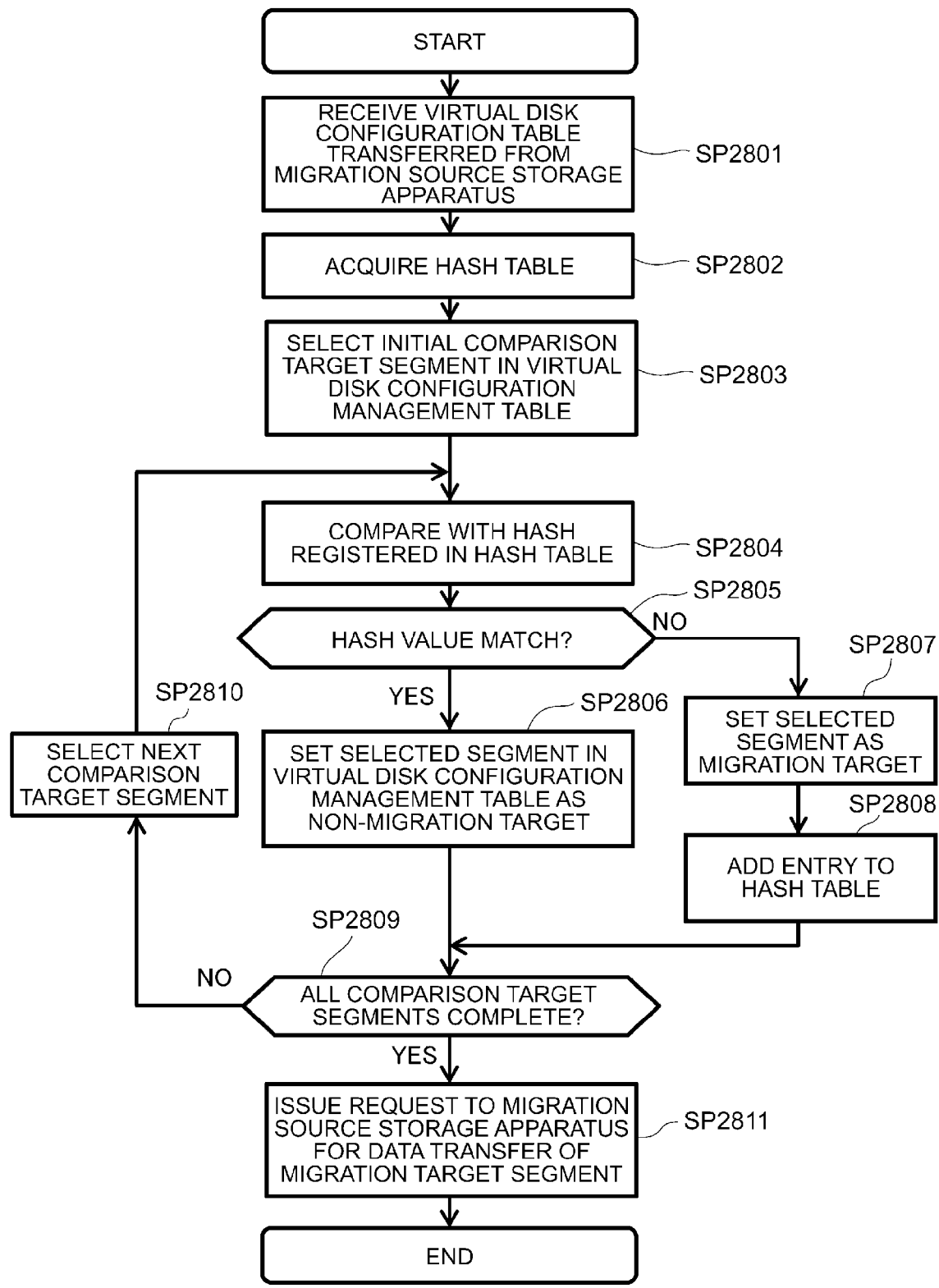
FIG. 29 is a flowchart showing storage duplicate determination processing.

FIG. 29 shows a processing routine for storage duplicate determination processing which is executed between the storage apparatus 100C and the storage apparatus 110C. This storage duplicate determination processing is executed by means of co-operation between the CPU 160 of the migration destination storage apparatus 110C and the capacity virtualization program 210, the duplicate removal program 220, and the data I/O control program 230 which are stored in the memory 200C. Further, the storage duplicate determination processing is executed after the virtual disk duplicate determination processing illustrated in FIG. 12. Hereinafter, for the sake of convenience in the description, the control unit 150 is described as the processing subject.

Since this processing is the same as the pool duplicate determination processing of FIG. 13 except for steps SP2808 and SP2811, a description of this processing is omitted here.

Note that the storage duplicate determination processing differs from the pool duplicate determination processing in FIG. 13 according to the first embodiment in that the data comparison targets are the pool area 350 in the storage apparatus 100C and the pool area 350 in the storage apparatus 110C.

The control unit 150 of the migration destination storage apparatus 110C receives information of the virtual disk configuration management table 900 which is transferred from the migration source storage apparatus 100C (SP2801).

The control unit 150 then processes the processing of steps SP2802 to SP2810 except step SP2808 in the storage apparatus 110C in the same way as the pool duplicate determination processing in FIG. 13. Further, the control unit 150 issues a request to the migration source storage apparatus 100C to request data transfer of non-duplicate migration target segments between the storage apparatuses (SP2811) and ends the storage duplicate determination processing.

Note that, the pool data migration processing according to the fourth embodiment is the same as the pool data migration processing illustrated in FIG. 14 according to the first embodiment. For example, in the fourth embodiment, the pool data migration processing illustrated in FIG. 14 involves the migration destination storage apparatus 110C issuing, in step SP1401, a request to the migration source storage apparatus 100C to request data transfer of migration target segments and involves instructing the migration source storage apparatus 100C to delete the migration source data from the migration destination storage apparatus 110C in step SP1406.

(4-3) Effect of the Fourth Embodiment

As mentioned earlier, with the storage system 1C and the data migration method according to the fourth embodiment, when the virtual disk 320 is migrated between the storage apparatus 100C and the storage apparatus 110C which are different, the data of the migration target can be selected in a duplicate-removed state and duplicate data can be removed from the migration targets by performing, in advance, a duplicate determination against the data which already exists in the migration source storage apparatus 110C, and hence the data transfer amount during migration of the virtual disk 320 can be reduced.

Since data is accordingly migrated in a duplicate-removed state, data restoration to the conventionally required non-duplicate removal state and repeated duplicate removal processing can be omitted. Accordingly, the time for migrating the virtual disk 320 can be shortened and the processing load can be alleviated.

REFERENCE SIGNS LIST 1 storage system
180 Host

310 Virtual machine
320 Virtual disk
330 Logical segment
100 Storage apparatus
350 Pool
360 Real volume
370 Physical segment
160 CPU
200 Memory
210 Capacity virtualization program
220 Duplicate removal program
230 Data I/O program

The invention claimed is:

1. A storage apparatus, comprising:
a control unit which is configured to manage a plurality of virtual volumes which are provided to a host, and a plurality of pool areas in which storage areas are assigned to the plurality of virtual volumes,
wherein the virtual volumes comprise virtual disks which store data from the host and the virtual disks comprise a plurality of logical segments,
wherein the pool areas comprise real volumes which actually store data from the host and the real volumes comprise a plurality of physical segments,
wherein the control unit is configured to manage the logical segments in the virtual disks in association with the physical segments in the pool areas, for each of the plurality of pool areas, and
wherein, if one virtual disk which is associated with one pool area is migrated to another pool area which differs from the one pool area, the control unit is configured to execute duplicate determination of data in the one virtual disk which is associated with the one pool area, execute the data duplicate determination between the one virtual disk which is associated with the one pool area and the other pool area on the basis of result of the duplicate determination, and migrate data which is stored in logical segments that the one virtual disk comprises, excluding duplicate data, to the other pool area.

2. The storage apparatus according to claim 1,
wherein the control unit is configured to manage the logical segments that the one virtual disk comprises on the basis of an order of the logical segments that the one virtual disk comprises, and
wherein the control unit is configured to manage the logical segments that the one virtual disk comprises in association with hash values of data stored in the logical segments that the one virtual disk comprises.

3. The storage apparatus according to claim 1,
wherein the control unit is configured to manage the logical segments that the one virtual disk comprises in association with hash values of data stored in the logical segments that the one virtual disk comprises, and
wherein the control unit is configured to execute a data duplicate determination in the one virtual disk which is associated with the one pool area on the basis of the hash values associated with the logical segments that the one virtual disk comprises.

4. The storage apparatus according to claim 1,
wherein the control unit is configured to manage the logical segments that the one virtual disk comprises in association with hash values of data stored in the logical segments that the one virtual disk comprises, and
wherein the control unit is configured to execute a duplicate determination of data in the one virtual disk which is associated with the one pool area, and, by comparing hash values associated with remaining logical segments excluding logical segments storing redundant data determined to be in duplicate with hash values of data stored in the other pool area, the control unit is configured to execute a data duplicate determination between the one virtual disk and the other pool area.

5. The storage apparatus according to claim 1,
wherein, in the data duplicate determination between the one virtual disk which is associated with the one pool area and the other pool area, the control unit is configured to execute the data duplicate determination by comparing actual data which is stored on the one virtual disk which is associated with the one pool area with actual data which is stored in the other pool area.

6. The storage apparatus according to claim 1,
wherein, after migrating the one virtual disk to the other pool area, if a physical segment in the one virtual disk has not been associated with any of the logical segments that the one virtual disk comprises, the control unit is configured to delete the physical segment which is not associated with the logical segments that the one virtual disk comprises.

7. A storage system, comprising:
a plurality of storage apparatuses which comprise virtual volumes which are provided to a host and pool areas in which storage areas are assigned to the virtual volumes, and
a control unit which is configured to manage the plurality of storage apparatuses, wherein the virtual volumes comprise virtual disks which store data from the host and the virtual disks comprise a plurality of logical segments,
wherein the pool areas comprise real volumes which actually store data from the host and the real volumes comprise a plurality of physical segments, and
wherein the control unit is provided outside the storage apparatuses,
wherein the control unit is configured to manage the logical segments in the virtual disks in association with the physical segments in the pool areas, for each of the plurality of pool areas; and,
if one virtual disk which is associated with one pool area of any one storage apparatus among the plurality of storage apparatuses is migrated to another pool area which differs from the one pool area, the control unit is configured to execute duplicate determination of data in the one virtual disk which is associated with the one pool area, execute the data duplicate determination between the one virtual disk which is associated with the one pool area and the other pool area, and migrate data which is stored in logical segments that the one virtual disk comprises, excluding duplicate data, to the other pool area.

8. A data migration method for a storage apparatus which comprises a control unit which manages a plurality virtual volumes which are provided to a host and a plurality of pool areas in which storage areas are assigned to the plurality of virtual volumes,
wherein the virtual volumes comprise virtual disks which store data from the host and the virtual disks comprise a plurality of logical segments, and
wherein the pool areas comprise real volumes which actually store data from the host and the real volumes comprise a plurality of physical segments,
the data migration method comprising:
a first step in which the control unit manages the logical segments in the virtual disks in association with the physical segments in the pool areas, for each of the plurality of pool areas; and a second step in which, if one virtual disk which is associated with one pool area is migrated to another pool area which differs from the one pool area, the control unit executes duplicate determination of data in the one virtual disk which is associated with the one pool area, executes the data duplicate determination between the one virtual disk which is associated with the one pool area and the other pool area on the basis of a result of the duplicate determination, and migrates data which is stored in logical segments that the one virtual disk comprises, excluding duplicate data, to the other pool area.

9. The data migration method according to claim 8, wherein, in the first step, the control unit manages the logical segments that the one virtual disk comprises on the basis of an order of the logical segments that the one virtual disk comprises, and wherein the control unit manages the logical segments that the one virtual disk comprises in association with hash values of data stored in the logical segments that the one virtual disk comprises.

10. The data migration method according to claim 8, wherein, in the first step, the control unit manages the logical segments that the one virtual disk comprises in association with hash values of data stored in the logical segments that the one virtual disk comprises, and wherein in the second step, the control unit executes duplicate determination of data on the one virtual disk which is associated with the one pool area on the basis of hash values associated with the logical segments that the one virtual disk comprises.

11. The data migration method according to claim 8, wherein, in the first step, the control unit manages the logical segments that the one virtual disk comprises in association with hash values of data stored in the logical segments that the one virtual disk comprises, and wherein, in the second step, the control unit executes a duplicate determination of data in the one virtual disk which is associated with the one pool area, and, by comparing hash values associated with remaining logical segments excluding logical segments storing redundant data determined to be in duplicate with hash values of data stored in the other pool area, the control unit executes a data duplicate determination between the one virtual disk and the other pool area.

12. The data migration method according to claim 8, wherein, in the second step, in the data duplicate determination between the one virtual disk which is associated with the one pool area and the other pool area, the control unit executes the data duplicate determination by comparing actual data which is stored on the one virtual disk which is associated with the one pool area with actual data which is stored in the other pool area.

13. The data migration method according to claim 8, further comprising:

a third step in which, after migrating the one virtual disk to the other pool area, if a physical segment in the one virtual disk has not been associated with any of the logical segments that the one virtual disk comprises, the control unit deletes the physical segment which is not associated with the logical segments that the one virtual disk comprises.

* * * * *